(12) United States Patent
Taylor et al.

(10) Patent No.: US 11,036,923 B2
(45) Date of Patent: Jun. 15, 2021

(54) STRUCTURED DOCUMENT CREATION AND PROCESSING, DYNAMIC DATA STORAGE AND REPORTING SYSTEM

(71) Applicant: P3 Data Systems, Inc., Monument, CO (US)

(72) Inventors: Chris G. Taylor, Monument, CO (US); Nitin Chapke, Navi Mumbai (IN)

(73) Assignee: P3 Data Systems, Inc., Monument, CO (US)

( * ) Notice: Subject to any disclaimer, the term of this patent is extended or adjusted under 35 U.S.C. 154(b) by 0 days.

(21) Appl. No.: 16/156,589

(22) Filed: Oct. 10, 2018

(65) Prior Publication Data

US 2019/0108205 A1 Apr. 11, 2019

Related U.S. Application Data

(60) Provisional application No. 62/570,545, filed on Oct. 10, 2017.

(51) Int. Cl.
| | |
|---|---|
| G06F 40/143 | (2020.01) |
| G06F 16/93 | (2019.01) |
| G06F 40/151 | (2020.01) |
| G06F 40/18 | (2020.01) |
| G06Q 40/00 | (2012.01) |

(52) U.S. Cl.
CPC ............ *G06F 40/143* (2020.01); *G06F 16/93* (2019.01); *G06F 40/151* (2020.01); *G06Q 40/12* (2013.12); *G06F 40/18* (2020.01)

(58) Field of Classification Search
CPC .............................. G06F 17/2247; G06F 16/93
See application file for complete search history.

(56) References Cited

U.S. PATENT DOCUMENTS

| | | | |
|---|---|---|---|
| 7,752,542 B2* | 7/2010 | Cragun | G06F 16/83 |
| | | | 715/236 |
| 8,423,586 B2* | 4/2013 | Binstock | G06Q 10/10 |
| | | | 707/803 |

(Continued)

OTHER PUBLICATIONS

Claudiu Chiru, Liana Elefterie and Elena Iatan; XML Publishing Solutions for a Company; Journal of Applied Economic Sciences, 2007, vol. 2, issue 1(2)_Fall 2007; 8 pages; http://www.jaes.reprograph.ro/articles/Chiru.pdf (Year: 2007).*

(Continued)

*Primary Examiner* — Scott T Baderman
*Assistant Examiner* — Benjamin Smith
(74) *Attorney, Agent, or Firm* — Neugeboren O'Dowd PC

(57) ABSTRACT

A structured document creation system comprising one or more first files and a structured document creation portion. The one or more first files comprise a first file format and one or more first file attributes. The structured document creation portion comprises a plurality of first documents in a second file format with the second file format comprising a format different than the first file format. The structured document creation portion further comprises a plurality of rules relating to the second file format and an output comprising one or more second files. The one or more second files comprise the second file format and are dependent upon the plurality of first documents and the plurality of rules. The output comprises the one or more first file attributes, received directly from the one or more first files.

6 Claims, 18 Drawing Sheets

(56) References Cited

U.S. PATENT DOCUMENTS

| | | | |
|---|---|---|---|
| 8,510,259 B2* | 8/2013 | Binstock | G06F 16/211 |
| | | | 707/602 |
| 8,635,252 B2* | 1/2014 | Binstock | G06F 40/143 |
| | | | 707/803 |
| 2004/0194009 A1 | 9/2004 | LaComb et al. | |
| 2006/0184539 A1* | 8/2006 | Blake | G06F 40/174 |
| 2006/0230025 A1* | 10/2006 | Baelen | G06F 40/143 |
| 2008/0017722 A1* | 1/2008 | Snyder | G06Q 10/00 |
| | | | 235/494 |
| 2008/0028300 A1 | 1/2008 | Krieger et al. | |
| 2008/0255974 A1* | 10/2008 | Jacob | G06Q 10/06 |
| | | | 705/35 |
| 2009/0019358 A1* | 1/2009 | Blake | G06F 40/18 |
| | | | 715/234 |
| 2009/0144611 A1* | 6/2009 | Rohan | G06F 17/2247 |
| | | | 715/234 |
| 2011/0071958 A1* | 3/2011 | Grody | G06Q 40/06 |
| | | | 705/36 R |
| 2011/0137923 A1* | 6/2011 | Koroteyev | G06F 40/169 |
| | | | 707/756 |
| 2011/0258167 A1* | 10/2011 | Binstock | G06F 16/283 |
| | | | 707/690 |
| 2012/0185373 A1* | 7/2012 | Grody | G06Q 40/04 |
| | | | 705/37 |
| 2012/0239610 A1* | 9/2012 | Binstock | G06F 16/283 |
| | | | 707/602 |
| 2012/0239611 A1* | 9/2012 | Binstock | G06F 16/86 |
| | | | 707/602 |
| 2013/0018923 A1* | 1/2013 | Ferris | G06F 16/88 |
| | | | 707/803 |
| 2013/0060814 A1* | 3/2013 | Hui | G06F 16/86 |
| | | | 707/802 |
| 2013/0117268 A1* | 5/2013 | Smith | G06F 40/117 |
| | | | 707/739 |
| 2013/0326336 A1* | 12/2013 | Lanque | G06F 17/218 |
| | | | 715/234 |
| 2014/0115442 A1* | 4/2014 | Caten | G06F 40/205 |
| | | | 715/234 |
| 2017/0287090 A1 | 10/2017 | Hunn et al. | |

OTHER PUBLICATIONS

Kristen James Eberlein; "Darwin Information Typing Architecture (DITA) Version 1.3 Part 3: All-Inclusive Edition"; Sep. 3, 2015; 1199 pages; http://docs.oasis-open.org/dita/dita/v1.3/cos01/part3-all-inclusive/dita-v1.3-cos01-part3-all-inclusive.html (Year: 2015).*

Phillip Engel, et. al.; "Extensible Business Reporting Language (XBRL) 2.1 Specification" Feb. 20, 2013; 154 pages; http://www.xbrl.org/Specification/XBRL-2.1/REC-2003-12-31/XBRL-2.1-REC-2003-12-31+corrected-errata-2013-02-20.html (Year: 2013).*

Liz Andrews; "Extensible Business Reporting Language (XBRL) An overview for technical users"; Nov. 3, 2010; 33 pages; https://www.altova.com/whitepapers/XBRL_whitepaper.pdf (Year: 2010).*

Thomas, Shane, "International Search Report and Written Opinion Regarding International Application No. PCT/US18/55238", dated Dec. 7, 2018, p. 18 Published in: WO.

* cited by examiner

Income Statement [Abstract]
Consolidated Statements of Income - USD ($) $ in Thousands

210

|  | 12Months ended 12/31/17 |
|---|---|
| Net sales | 863,717 |
| Cost of goods sold | 567,937 |
| Gross profit | 295,780 |
| Selling, general and administrative expenses | 164,964 |
|  |  |
| Operating income | 76,151 |
| Interest Expense | 18,602 |
|  |  |
| Net income | 32,585 |

```
<td
  style="BACKGROUND-COLOR: #c0c0c0;text-align:null;font-size:null;color:null;font-family:null;height:null;width:null;background-color:null;white-space:nowrap;font-size:10pt;font-family:Times New Roman;"
  ><ix:nonFraction id="Fact_263" contextRef="AsOf2018-06-30"
  name="us-gaap:InventoryFinishedGoods" unitRef="USD" decimals="-3" scale="3"
  format="ixt:numdotdecimal">60,430</ix:nonFraction></td>
```

ACME, Inc.
NOTES TO CONDENSED CONSOLIDATED FINANCIAL STATEMENTS (UNAUDITED)

Note 3. Business Activities

In March 2018, the Company, jointly with certain employees and one of the Company's board members, formed an entity for one of its research and development projects ("AC"). AC is considered a variable interest entity. The Company does not consolidate the results of operations of AC, commencing March 2018, as the Company no longer holds the power to direct the activities that most significantly affect the economic performance of AC. Following this transaction, the Company transferred cash, long-lived assets and the related IP into AC and retained a minority equity interest in AC. As a result of this transaction, the Company recorded $1.6 million of non-cash charges under its operating expenses and $5.0 million under share in losses of associated companies due to the write-off of its related in-process research and development project.

In March 2018, as part of its continuous efforts to rationalize its operating model, the Company sold one of its facilities (which included land and building) in Eden Prairie, Minnesota for total consideration of approximately $3.7 million in cash. As a result of the sale of its facility, the Company recognized a gain of approximately $1.6 million included in selling, general and administrative expenses.

Note 4. Inventories

Inventories consisted of the following:

|  | June 30, 2018 | December 31, 2017 |
|---|---|---|
|  | U.S. $ in thousands | |
| Finished goods | $ 60,430 | $ 63,234 |
| Work-in-process | 3,403 | 2,271 |
| Raw materials | 53,206 | 50,212 |
|  | $ 117,039 | $ 115,717 |

Note 5. Goodwill and other Intangible Assets

*Goodwill*

Changes in the carrying amount of the Company's goodwill for the six-months ended June 30, 2018 were as follows:

U.S. $ in thousands

| Goodwill as of January 1, 2018 | $ 387.1 |
|---|---|
| Translation differences | (0.4) |
| Goodwill as of June 30, 2018 | $ 386.7 |

During the fourth quarter of 2017, the Company performed a quantitative assessment for goodwill impairment for its EMCA reporting unit.

Following its quantitative assessment, the Company concluded that the fair value of its EMCA reporting unit exceeded its carrying amount by approximately 7%, with a carrying amount of goodwill assigned to this reporting unit in an amount of $387 million.

STRUCTURED DOCUMENT CREATION AND PROCESSING, DYNAMIC DATA STORAGE AND REPORTING SYSTEM

CLAIM OF PRIORITY UNDER 35 U.S.C. § 119

The present Application for Patent claims priority to Provisional Application No. 62/570,545, entitled "Document Creation, Processing and Data Reporting System," filed Oct. 10, 2017, and expressly incorporated by reference herein.

BACKGROUND

Field

The present invention is related to a document creation system. In particular, but not intended to limit the invention, the present invention is related to a financial reporting document creation system.

Background

Creating documents to meet prior-specified format and structure requirements is often a tedious and time-consuming process. Current document creation systems require the manual implementation of all financial information and structured formatting to ensure each document contains the appropriate information in the required format. For example, when filing United States ("U.S.") Security and Exchange Commission ("SEC") forms such as, but not limited to, Form 10-Q and Form 10-K, companies are required to manually input, or "tag", specified financial data within a pre-defined Hypertext Markup Language ("HTML") structure. Currently, manual input of such tags is conducted through the use of a text editor such as, but not limited to, Microsoft® Word. Microsoft® Excel® may comprise the financial analysis data entry format. Microsoft® and Excel® are registered trademarks of Microsoft Corporation, located at One Microsoft Way, Redmond, Wash. 98052.

SUMMARY

In order to reduce the time and long-term cost associated with creating such financial documents, along with other documents requiring specific data types and structures, a mechanism has been created to access specific financial data directly from the source, automatically creating the proper format of the document with the proper information. One system enables the automated uploading and converting of various types of financial documents to a structured reporting format. One such process may include utilizing a Darwin Information Typing Architecture ("DITA") taxonomy directly accessing eXtensible Business Reporting Language ("XBRL") data. XBRL® is a registered trademark of XBRL International, Inc., located at 100 Walnut Avenue, Suite 103, Clark, NJ 07066. Highly-stylized reports may be published from this editor and/or document using, for example, an XML Professional Publisher ("XPP") publishing system. Example reports may comprise Portable Document Format ("PDF") documents, Electronic Data Gathering, Analysis, and Retrieval system ("EDGAR") HTML and/or XBRL filing SEC documents, among other formats.

BRIEF DESCRIPTION OF THE DRAWINGS

FIG. 2 is an example of a customer data document as referenced in FIG. 1;

FIG. 5 is one example of DITA code with XBRL tags in a format to create a portion of a deliverable;

FIG. 6 is a deliverable utilizing the DITA code with XBRL tags of FIG. 5;

FIG. 7 is one example of a customer interface according to an embodiment of the invention;

FIG. 8 is one example of the customer interface of FIG. 7 displaying an add entity screen according to an embodiment of the invention;

FIG. 9 is one example of the customer interface of FIG. 7 displaying an add file screen according to an embodiment of the invention;

FIG. 10 is one example the customer interface of FIG. 7 according to an embodiment of the invention;

FIG. 12 is one example of the component content management system of FIG. 11 displaying DITA information according to an embodiment of the invention;

FIG. 13 is one example of the component content management system of FIG. 11 displaying DITA information according to an embodiment of the invention;

FIG. 14 is one example of the component content management system of FIG. 11 displaying DITA and XBRL information according to an embodiment of the invention;

Figure 15:
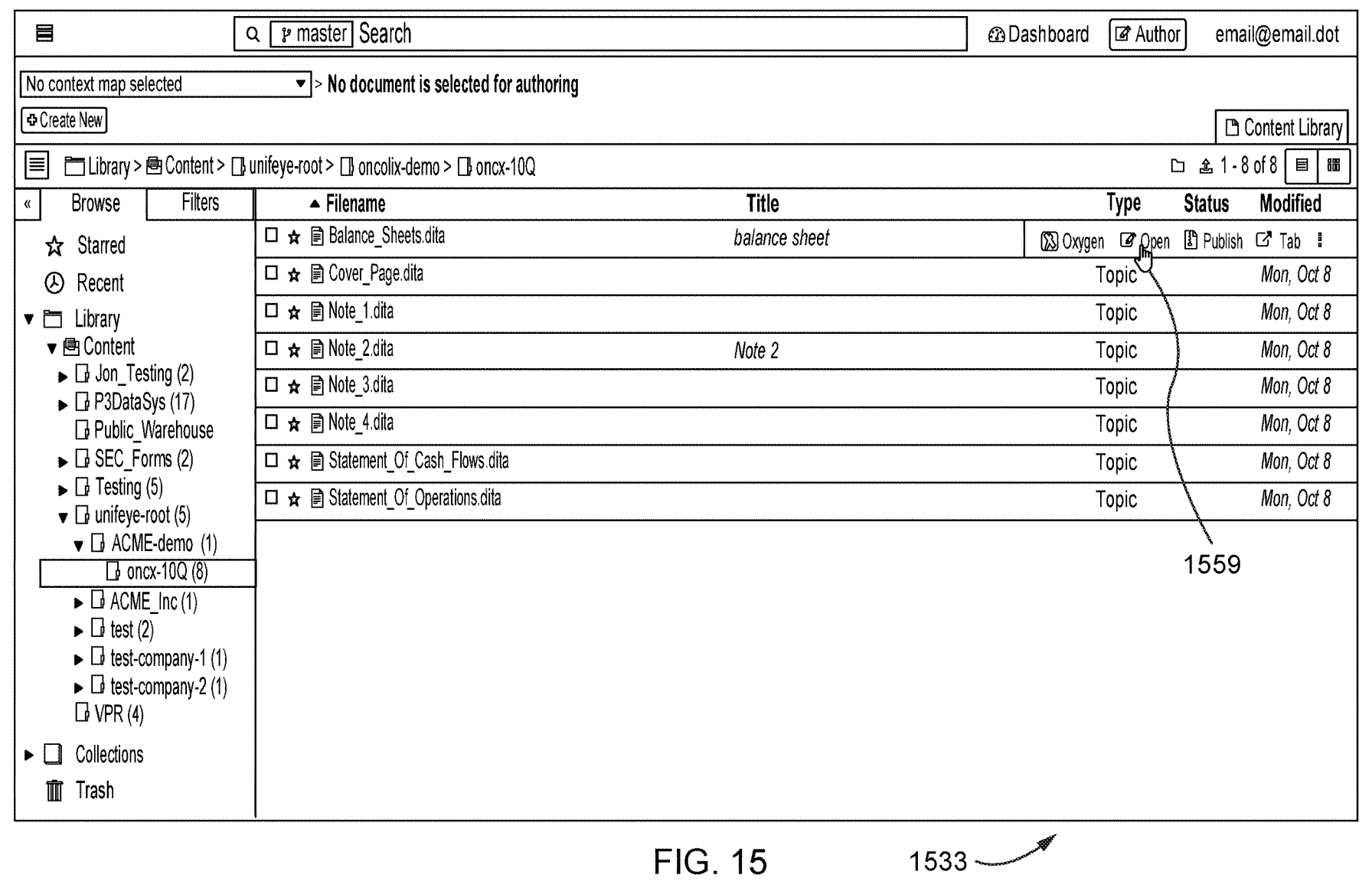

FIG. 15 is one example of the component content management system of FIG. 11 displaying DITA documents according to an embodiment of the invention; and FIG. 16 is one example of the component content management system of FIG. 11 displaying DITA code and a DITA document with XBRL data according to an embodiment of the invention.

DETAILED DESCRIPTION

Figure 1:
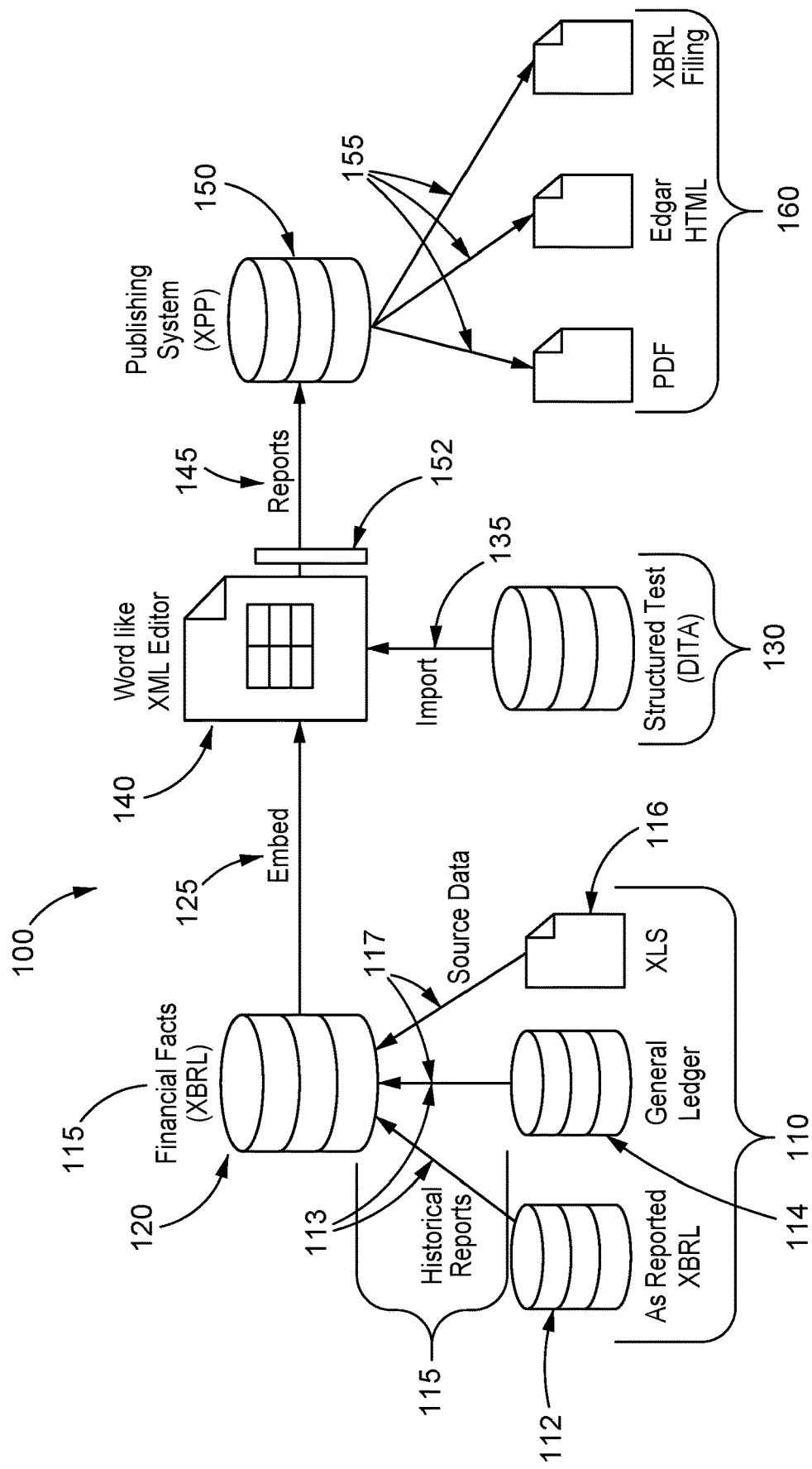
FIG. 1 is a bock diagram depicting an exemplary implementation of a structured document creation and processing system, dynamic data storage and reporting system.

Looking first at FIG. 1, seen is a graphical representation of one type of document creation and processing, dynamic data storage and reporting system 100. The document creation and processing, dynamic data storage and reporting system 100 may also be referred to herein, or known in the art as, as a structured document creation system, component content management system, or simply, a system 100. One or more portions of the system 100 may also be referred to individually, or together, as a component content management system ("CCMS"). For the sake of clarity, while the system 100 seen in FIG. 1 and the description provided herein may only display and describe a single device related to each element (e.g., a single customer data XBRL database 112, general ledger database 114, Microsoft® Excel® file format ("XLS") document 116 and/or process (e.g. historical reports 113 and source data 117 transfers 115 from the customer data 110), it is contemplated that each system element/device/process described herein and/or shower the figures may instead comprise one or more additional numbered devices or process steps. It is further contemplated that two or more devices (e.g., the customer data XBRL database 112, general ledger database 114, and/or XLS document 116) and/or process (e.g. historical reports 113 and source data 117 transfers 115 from the customer data 110) may be combined into a single device and/or process. Furthermore, two or more of the system elements shown in FIG. 1 may be located at the same physical location. Alternatively, two or more of the system elements displayed in FIG. 1 may be located at separate and distinct physical locations. Additionally, although various aspects and functionality described here may relate to a particular device, process, or the system 100 as a whole, it is contemplated that such functionality may be ported or transferred to, any other device(s), process (es), or portion(s) of the system 100.

Figure 7:
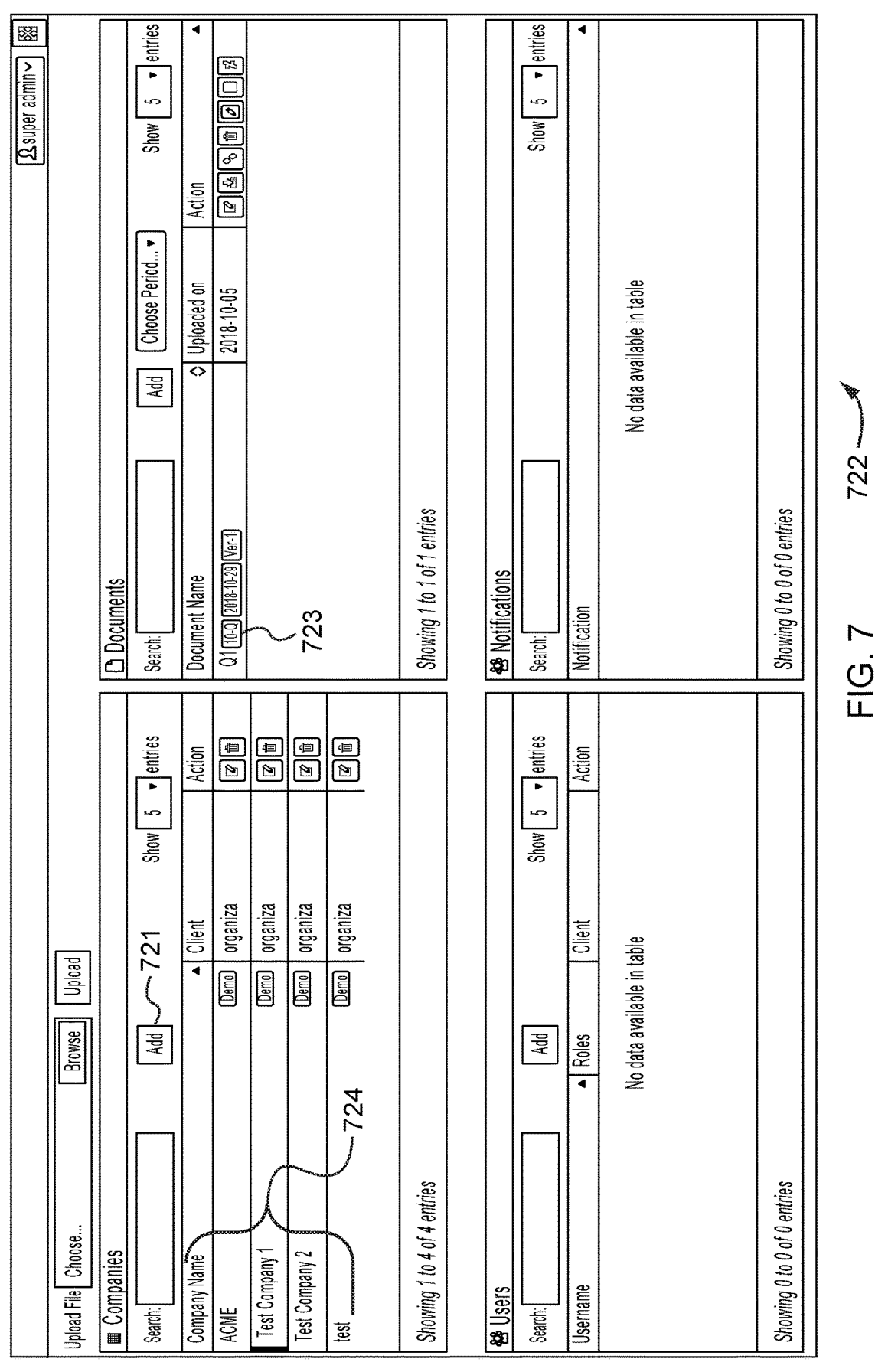

In one embodiment of the system 100, customer data 110 may be provided to the system 100 in order for the system to output a document, also referred to herein as a deliverable 160. The customer data 110 may be referred to herein as a first file or one or more first files. The system dashboard 722, also referred to herein as a dashboard 722, seen in FIG. 7 may comprise one such interface that enables transfer of the customer data 110 seen in FIG. 1 to the system 100. Upon selecting an entity 724 associated with the system 100, the dashboard 722 may display a document 723 associated with that entity 724. In FIG. 7, the document 723 comprises a form 10-Q, with the dashboard 722 also displaying a date and version associated with the document 723.

Figure 8:
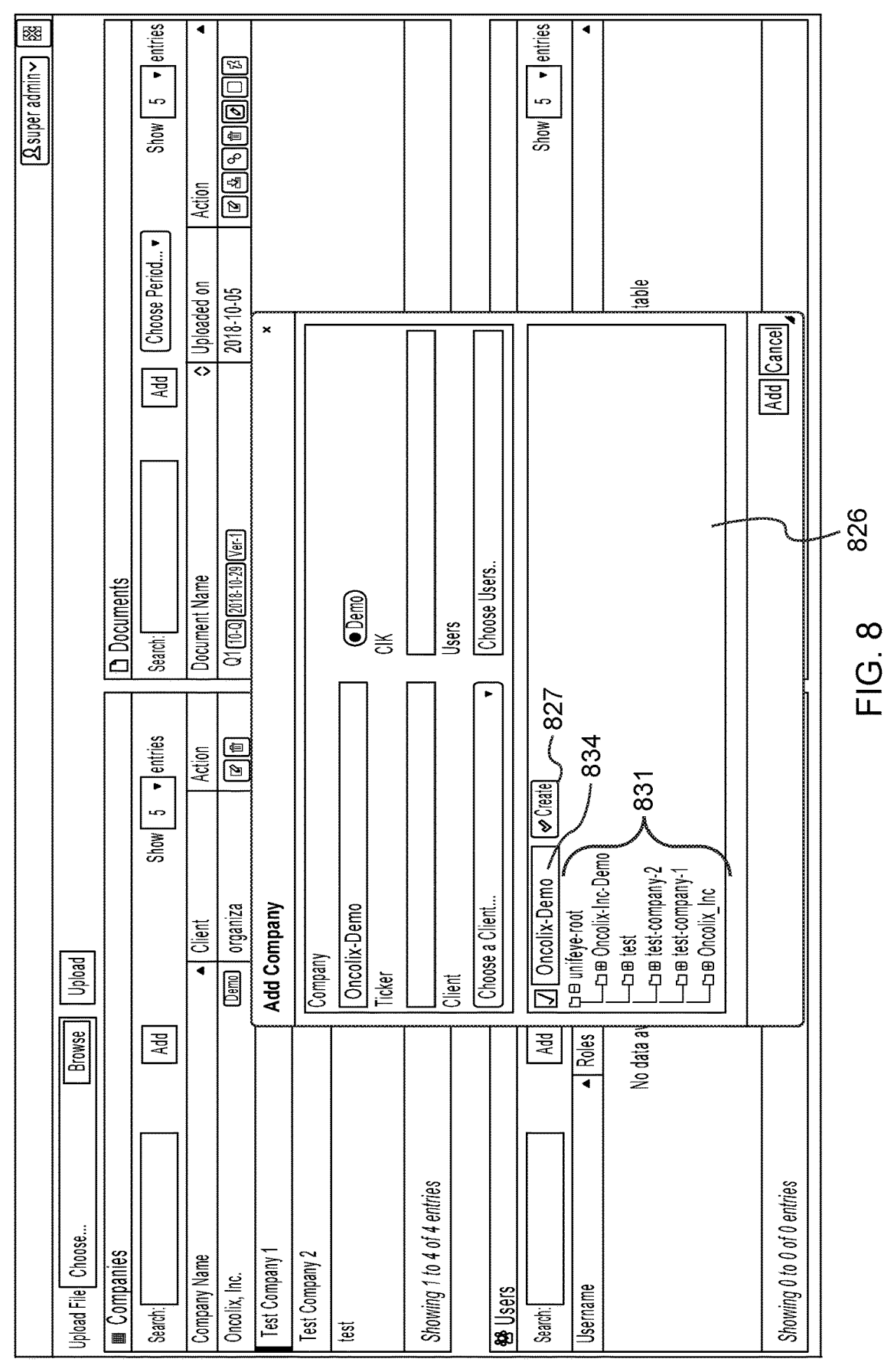

In order to utilize the system dashboard 722 to upload customer data 110 to the system 100, a user may first select the add entity 721 soft button to add an entity to the system 100, displaying the add entity screen 826 seen in FIG. 8. As seen, an entity name, ticker symbol, and Central Index Key ("CIK") may be associated with the entity. A folder 831 may be created and/or associated with the entity upon creating 827 the entity in the system 100.

Figure 9:
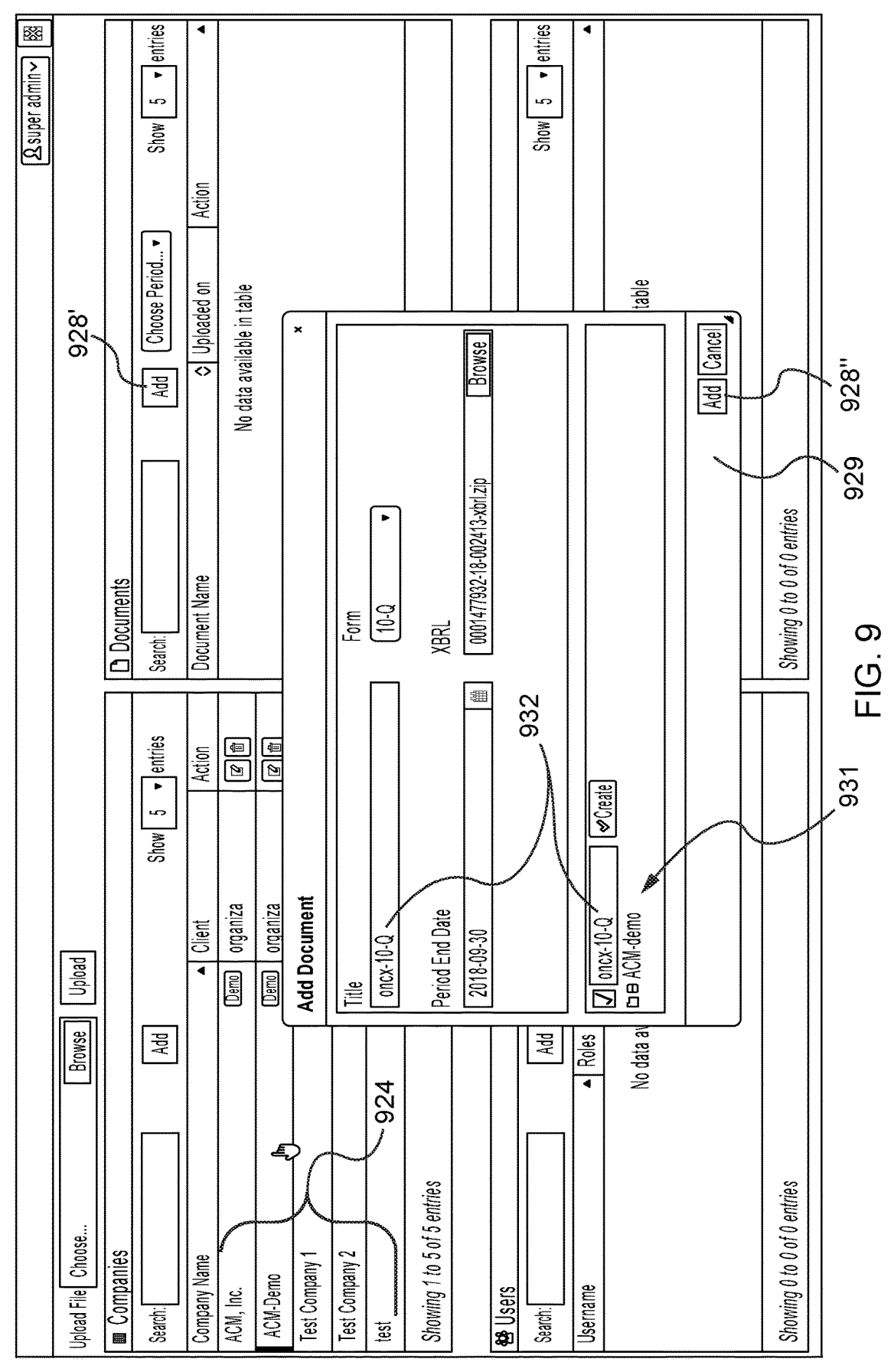
Figure 10:
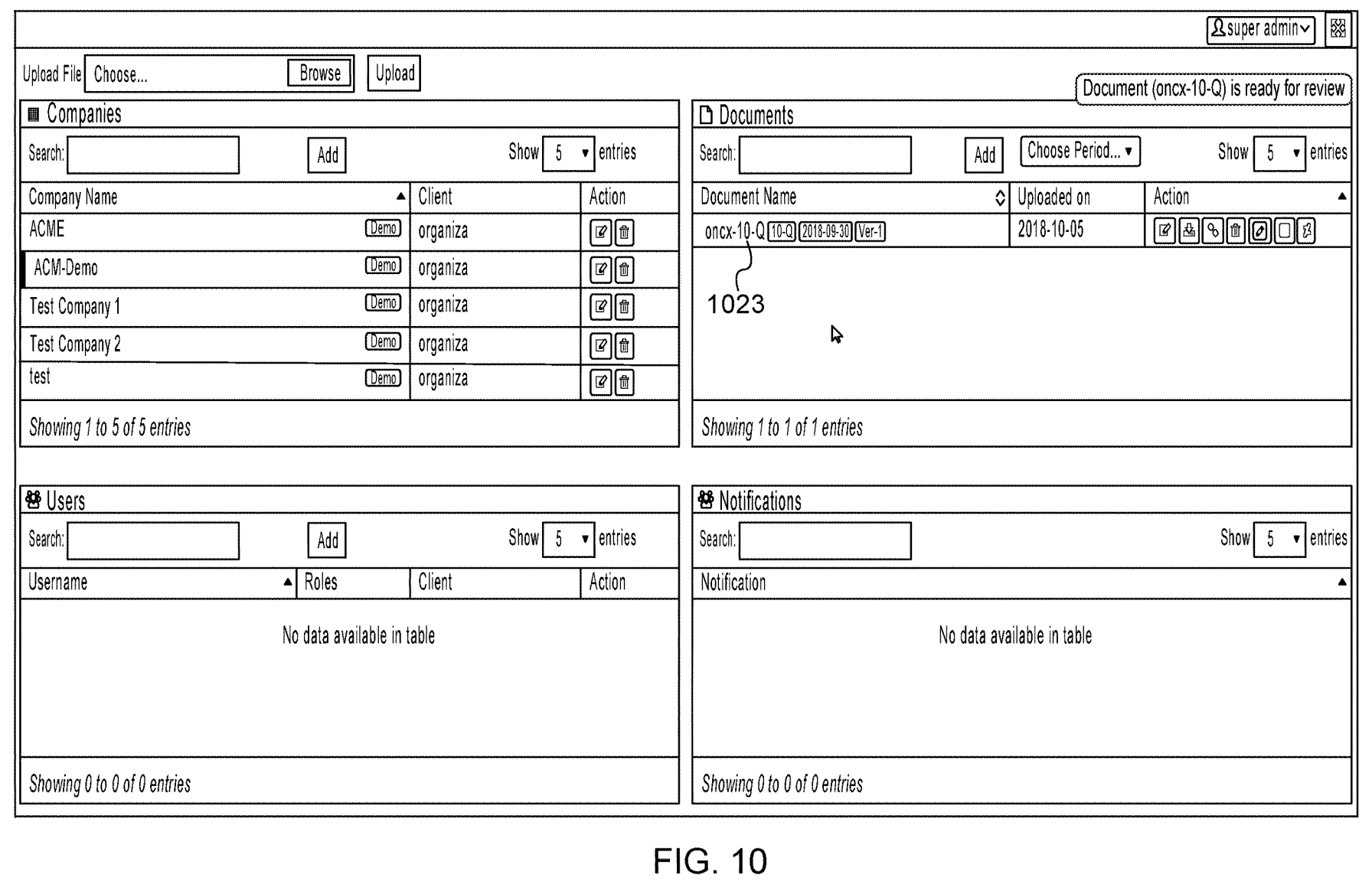

In looking now at FIGS. 7-9, after creating 827 the entity 924, the entity 924 may be displayed in the dashboard 722. Upon selecting the entity 924, a file may be added to the system 100 by selecting the first add document 928' soft button, displaying the add file screen 929. When adding a file through the add file screen 929 or in any other manner, the file may be identified with a name 932, type (e.g., 10-Q, 10-K, 485BPOS, etc.), end date for the period associated with the file, and a link to upload, or transfer 115, the file to the system 100. In the add document screen 929, the file data may comprise XBRL data and the XBRL data may comprise financial reporting information that may be related to a prior SEC filing. However, and as described below, other document data types and formats are contemplated for the customer data 110. The customer data 110 files may be referred to herein as a first file comprising a first file format. The document name 932 and document may be located within the previously-created folder 931. Upon selecting the second add document 928" soft button, the file will be uploaded and a document 1023 will be added to the system 100, as seen in FIG. 10. It is contemplated that the document 1023 may be stored on the XBRL database 120 seen in FIG. 1. Each of the devices seen in FIG. 1 may comprise a storage device and may store the one or more first files, the plurality of first documents, the plurality of rules, and/or the one or more second files.

The information in the uploaded file may comprise information related to the financial (e.g., numerical) data in any resultant deliverable 160. Throughout the specification and claims, references are made to both "files" and "documents".

It is contemplated that these terms may be interchangeable, where appropriate. Furthermore, various formats and teletypes described herein are contemplated to comprise formats and filetypes comprising tagged data, as known in the art and described herein.

The uploaded XBRL file described above may comprise the customer data 110 seen in FIG. 1. Although the process and interface described above with reference to FIGS. 7-10 is one manner of transferring 115 customer data to the system 100, it is contemplated that such customer data 110 may also be manually uploaded to the system 100 or automatically sent to the system 100 from a customer location through, for example, a server script accessing the data on a customer-facing device. Other methods known in the art are also contemplated. Regardless of the manner in which the system 100 receives the customer data 110, the received customer data 110 may comprise multi-sourced data. For example, FIG. 1 shows received customer data 110 in the form of as-reported XBRL data (e.g., prior reports submitted to the SEC) or data comprising an XBRL data format (e.g., using a ".xbrl" file extension or format) located on a customer XBRL database 112 or other XBRL storage device. Data received from the customer XBRL database 112 may also be in the form of an XML file submission from, for example, an historical EDGAR XBRL database. Other XBRL data types or formats known in the art are also contemplated. Customer data 110 may further comprise data included in a general customer ledger database 114 or proprietary business ledger or data formatted within an XLS document 116, (e.g., an Excel® spreadsheet, using a ".xls" file extension or format, or Microsoft® Word Document, using a ".doc" or ".docx" file extension or format). Other financial customer data 110 types, e.g., .doc and .xbrl extensions, and other data types known in the art are also contemplated.

Seen in FIG. 2 is one example of customer data 210 that may be uploaded to the system 100. The customer data 210 seen in FIG. 2 is in the form of an XLS document comprising an income statement. The FIG. 2 income statement comprises rows 218 of information correlating to Generally Accepted Accounting Principles ("GAAP") financial data.

In addition to the customer data 110 comprising historical financial reports or source financial data for various aspects of a business venture, the customer data 110 may also relate to other types of business or organizational information. For example, it is contemplated that customer data 110 related to school districts, sports and recreation leagues, and municipalities may be provided to the system 100. Similarly, it is contemplated that the structure of the deliverable 160 document created by the system may align with a format promulgated by governmental regulations and/or standards set by a governing body, or as set by a global nonprofit consortium which adopts open standards for a specific industry.

Figure 11:
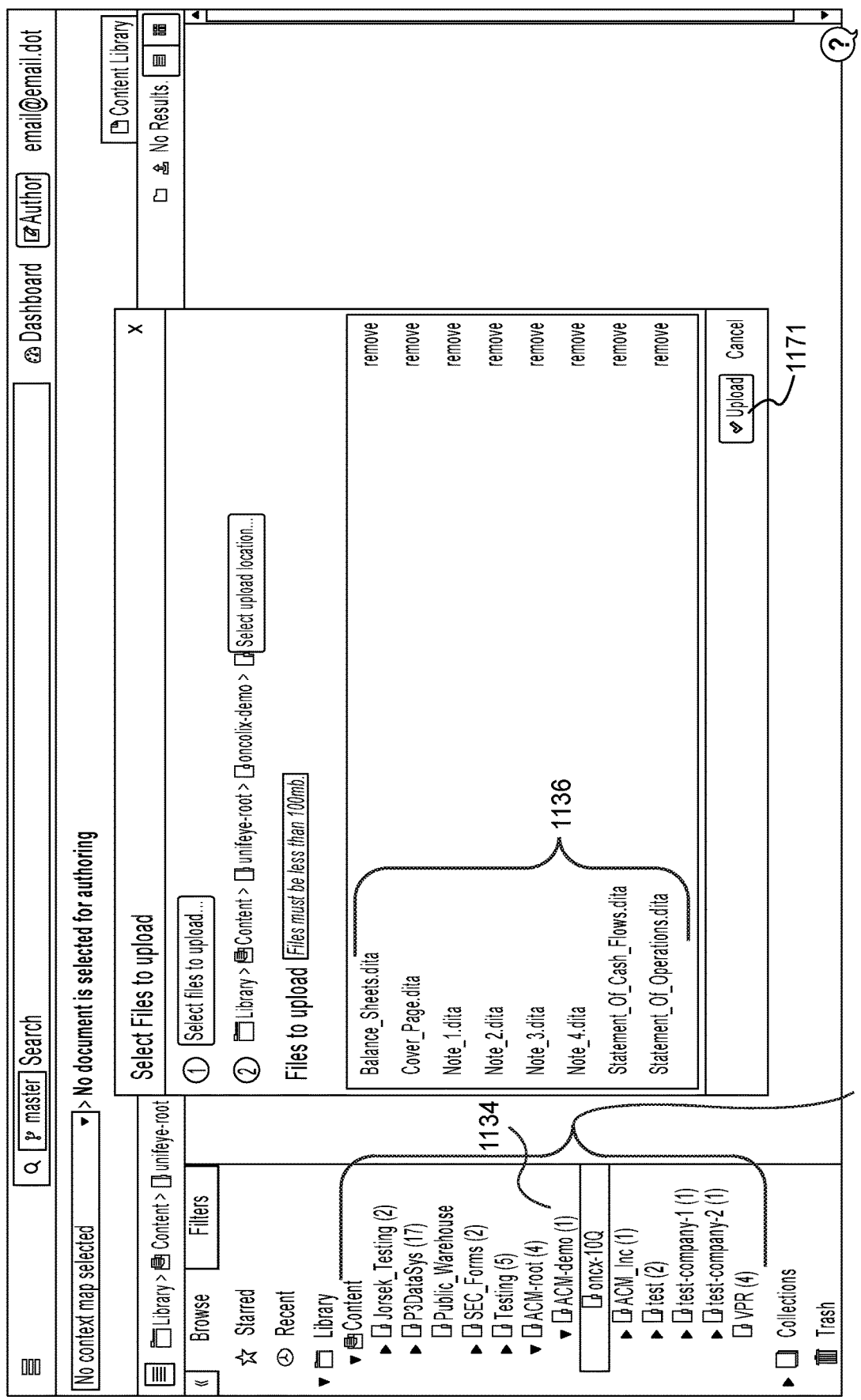
FIG. 11 is one example of a component content management system according to an embodiment of the invention.

In returning now to FIG. 10, after the document 1023 is created in the system 100, a CCMS file system 1133 may be accessed, such as, but not limited to, the easy DITA CCMS, as seen in FIG. 11. The previously-created folder 834, as seen in FIG. 8, will also now be seen in the folder 1134 in FIG. 11. Upon accessing this folder 1134, additional files 1136 may be uploaded 1171 to the folder 1134. These additional files 1136 may be referred to herein as first documents. For example, previously-created DITA files may be added to the folder 1134. Each DITA tile may comprise a DITA topic and may be related to a specific format necessary to create an SEC reporting document. As such, the additional files 1136 may also be referred to herein as DITA topics and/or DITA topic files. Other structured data document filetypes and formats are contemplated. The DITA files may be stored on the structed text database 130 and may comprise information related to text or prose in any resultant deliverable 160 as seen in FIG. 1. It is further contemplated that other file types such, as but no limited to, Microsoft® Word and PDF documents may be converted to DITA documents, or other structured data types.

Figure 3:
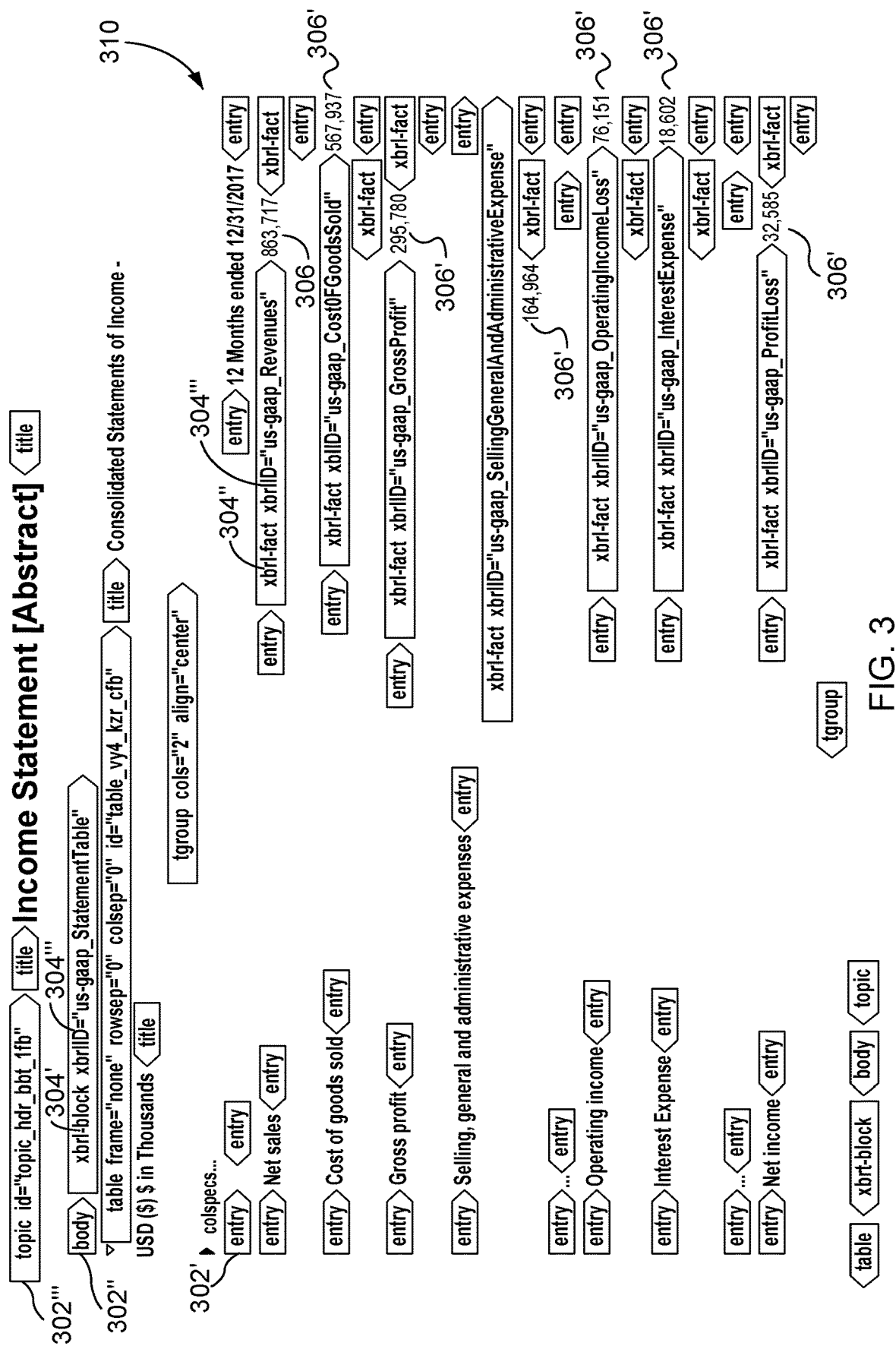
FIG. 3 example of a DITA document with XBRL tags for the customer data document of FIG. 1.
Figure 12:
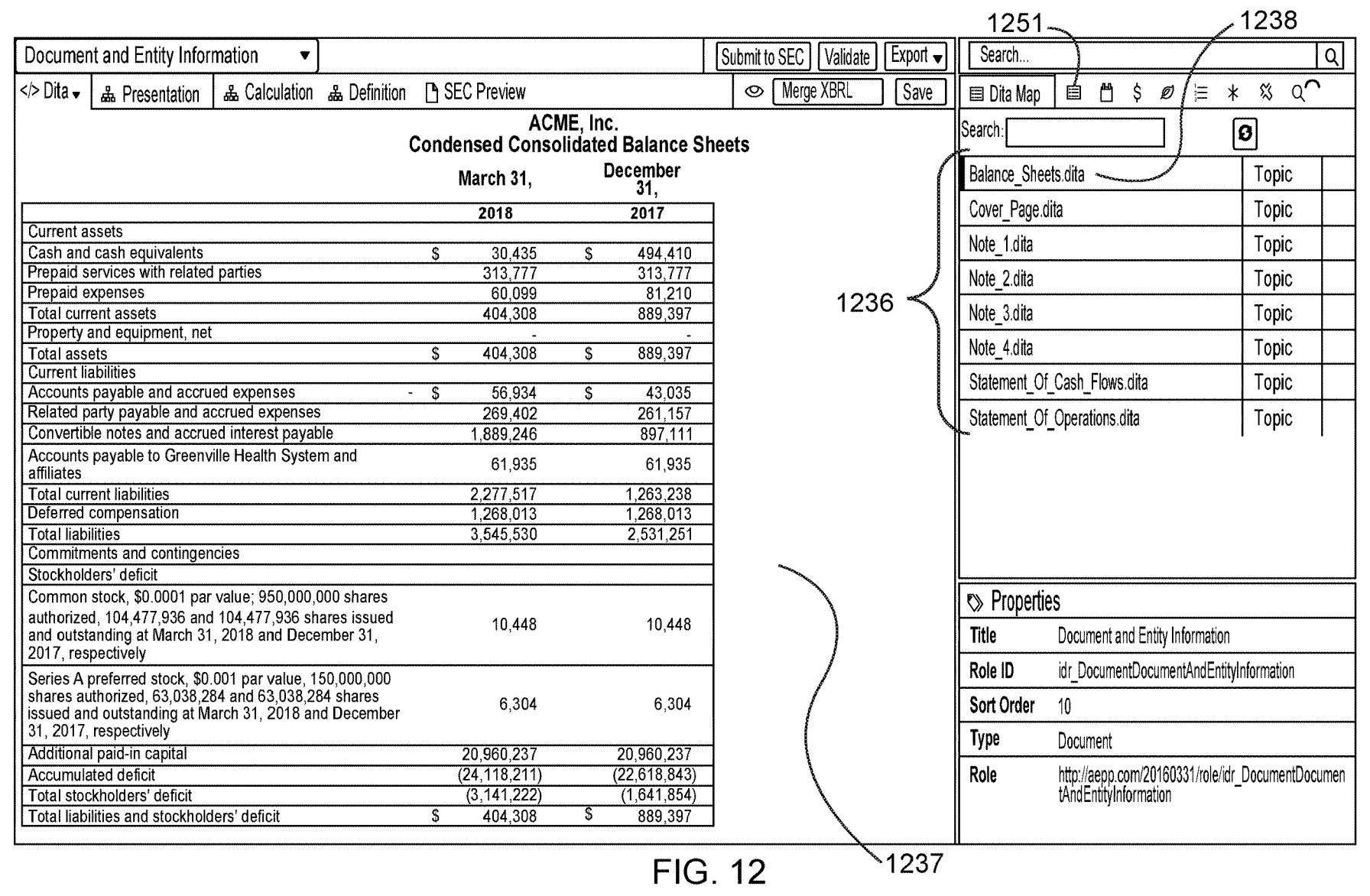
Figure 13:
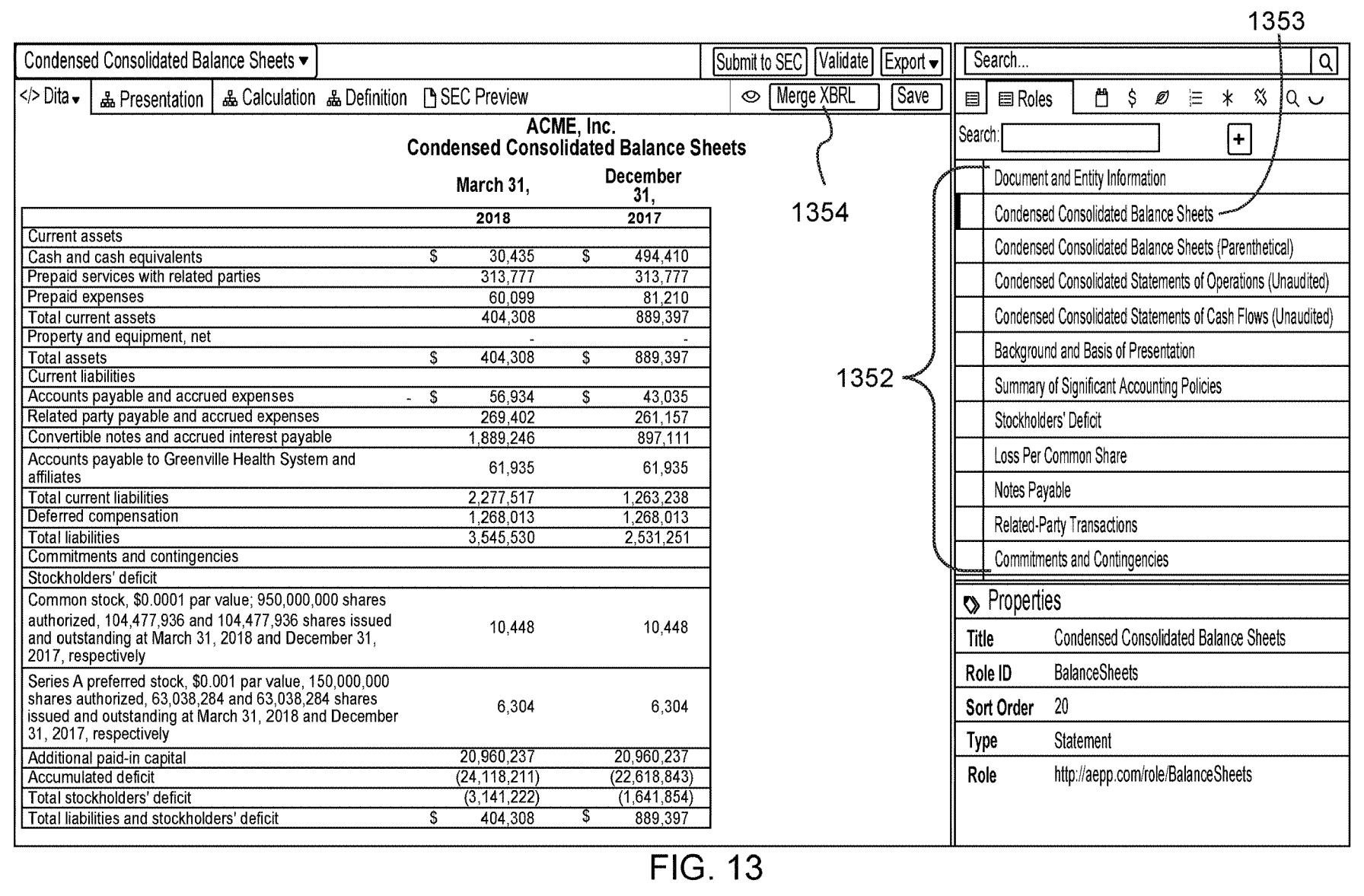

As seen in FIG. 12, upon loading the DITA data to the system 100, DITA information associated with a selected one of the additional files 1236 may be seen in a DITA display 1237. The additional files may also be referred to herein as DITA topic files. The format of the DITA display 1237 seen in FIG. 12 is provided by the selected Balance_Sheets.dita topic file 1238. After selecting a particular DITA topic, the DITA file may be prepared to receive the XBRL data by, for example, combining an XBRL role container with the DITA topic to properly organize and format the DITA data. Each role may comprise a certain hierarchical structure for placement of the XBRL data. For example, a user may select a Roles soft button 1251 to display one or more available XBRL roles 1352, as seen in FIG. 13, to apply to the DITA topic so the XBRL data is properly formatted within the DITA topic. Here, a "Condensed Consolidated Balance Sheet" role 1353 may be applied to the previously-selected Balance_Sheets.dita DITA topic in order to organize and display the XBRL data with a structure of a balance sheet. Once a DITA topic file is selected from one of the additional files 1236 and one of the XBRL roles 1352 is applied to the DITA topic file, the attribute xbrlID element 304''', as seen in FIG. 3 and described below, may be added to an xbrl-block, as seen in the figures. In one embodiment, the XBRLID element 304''' may comprise a "roleid", as seen in the figures. Each role 1353 may be referred to herein as a rule.

Figure 14:
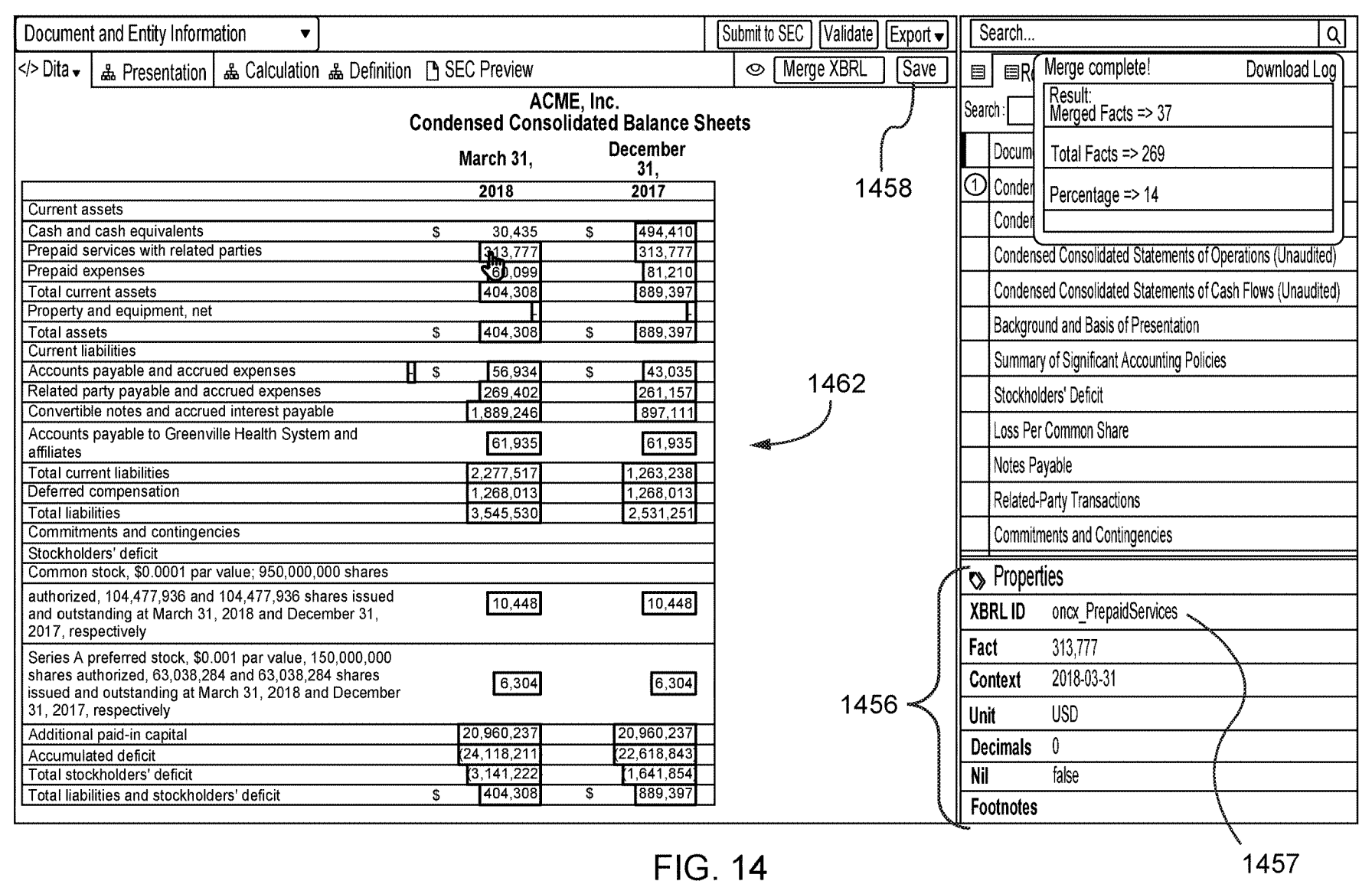
Figure 16:
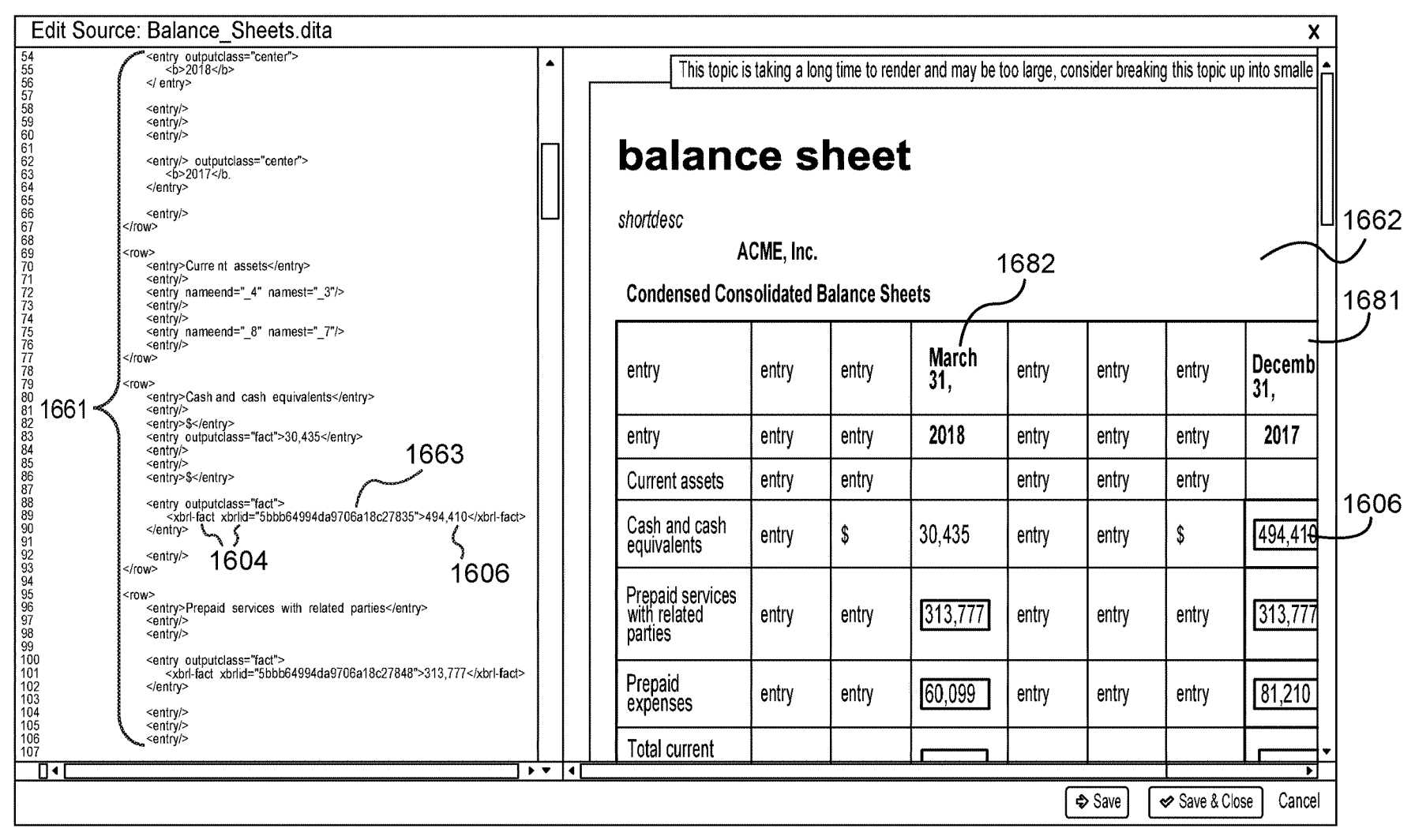

After the role 1352 is applied to the DITA topic, the XBRL data from the previously-uploaded XBRL file may be assigned to the DITA topic, for example, by selecting the Merge XBRL soft button 1354. This process assigns the XBRL data to the DITA topic. As seen in FIG. 13, style sheets have been applied to the DITA file to render the data as HTML. Other DITA topic additional files 1236 seen in FIG. 12 may be accessed and displayed as HTML through style sheet implementation. For example, the cover_page.dta DITA topic additional file 1236, may be displayed as an HTML display comprising an SEC form (e.g., form 10-Q) cover page merged with the XBRL data. By associating the role with the DITA topic, the XBRL data file will be merged under the role hierarchy of XBRL into a DITA document. The merge functionality described herein may automatically populate the financial documents with the XBRL tags and data directly within a separate CCMS financial document authoring system. The selected role 1352 may help structure received XBRL data within the DITA document to a specific format, assigning various properties 1456 (i.e., XBRL metadata) to each assigned XBRL data point in the DITA text. This XBRL information is saved in the DITA topics by creating, for example, the previously-mentioned "roleid" in the DITA file, that may be associated with the universally unique identifier within a table. The XBRL information may also be saved to the DITA topic via a created xbrl-fact tag. Seen in FIG. 16 is one such xbrl-fact tag, referred to herein as an XBRL tag 1604, corresponding to an "xbrlid" attribute and also associated with a UUID relating to the XBRL fact properties. The properties 1456 may be referred to herein as attributes. The example properties 1456 seen in FIG. 14 are related to the "Prepaid services with related parties" XBRL data displayed in the created DITA document 1462. For example, a user may select the numerical value associated with this data to display the properties 145. Here, that number is 313,777 in the document 1462. Upon merging the XBRL data with the DITA file, these properties 1456 are obtained directly from, and displayed from, the data in the uploaded XBRL file. As seen, the properties 1456 may comprise a numerical value or "fact", the reporting period or "context", and a currency "unit", among other properties. The system 100 may utilize an XBRL GUID 1457 to link, or map, these properties from the XBRL file to the DITA document 1462.

Upon selecting the Save soft button 1458, a file may be created in a format accessible by a single-source publishing tool. One such tool may comprise the easy DITA CCMS. Seen in FIG. 16 is one example of the a single-source publishing tool, or editor, displaying the saved data within the CCMS. One CCMS may be located on the same platform, system, application, or program, as the merge functionality described herein. The file created may comprise a DITA file format. In looking at the easy DITA CCMS file system 1533, the code of created file may be viewed by selecting the open soft button 1659.

Seen in FIG. 16 is a portion of the code 1661 associated with the DITA file 1462 seen in FIG. 14 and the DITA file 1662 seen in FIG. 16. The DITA file 1462, 1662 may be referred to herein as a second file. The format, or data type, of the second file may comprise the same format as the additional files 1136. Each numerical data point, e.g., data 1606, in the DITA file 1462, 1662, may be associated with the uploaded XBRL data and properties via XBRL tags 1604 referencing a GUID 1663 to associate the XBRL data with the DITA file 1462, 1662. Specialization occurs in the CCMS setup to enable the CCMS, while processing the code 1661, to accept the GUID 1663 as a valid foreign element and associate the GUID 1663 with the XBRL properties 1446 through the XBRL GUID 1447. The GUID 1663 may be mapped to one or more of the XBRL properties 1446, enabling the DITA file 1462 to receive the XBRL properties 1456 directly from the XBRL source data in the system 100 and placed directly in the DITA file 1462 via the GUID 1663. Each DITA file 1462 may comprise a financial reporting document format.

Utilization of such a GUID 1663 enables re-use of the XBRL properties 1456 in future DITA documents. For example, a future DITA topic 1236 may use the same GUID 1663 or a new GUID 1663 to import the same XBRL data into a new DITA file 1462. When re-using the XBRL data in a future DITA topic 1236, the future topic 1236 may obtain XBRL information from the originally-uploaded XBRL file and a new XBRL file. The originally-uploaded XBRL file may comprise an original first file, with the original first file relating to a first reporting period. The new XBRL file may comprise a later-received first file, also referred to herein as a later first file. Each file may comprise XBRL properties, with the new XBRL file and the associated properties relating to a second reporting period. The second reporting period may comprise a reporting period after the first reporting period. For example, seen in FIG. 16 is a first reporting period 1681 and a second reporting period 1682.

The DITA file 1462 relating to the second reporting period 1682 XBRL data may include one or more GUIDs 1683 referencing the second reporting period XBRL data and one or more GUIDs referencing the first reporting period. In such an embodiment, the original DITA file 1462 created from the original XBRL data along may comprise an original second file relating to the first reporting period while the new DITA file 1462 created form the original and the new XBRL data may comprise an additional second file relating to the second reporting period. The output contained within the DITA file may receive display the one or more first file attributes received directly from the one or more first files and the one or more later first file attributes received directly from the one or more later first files.

Figure 17:
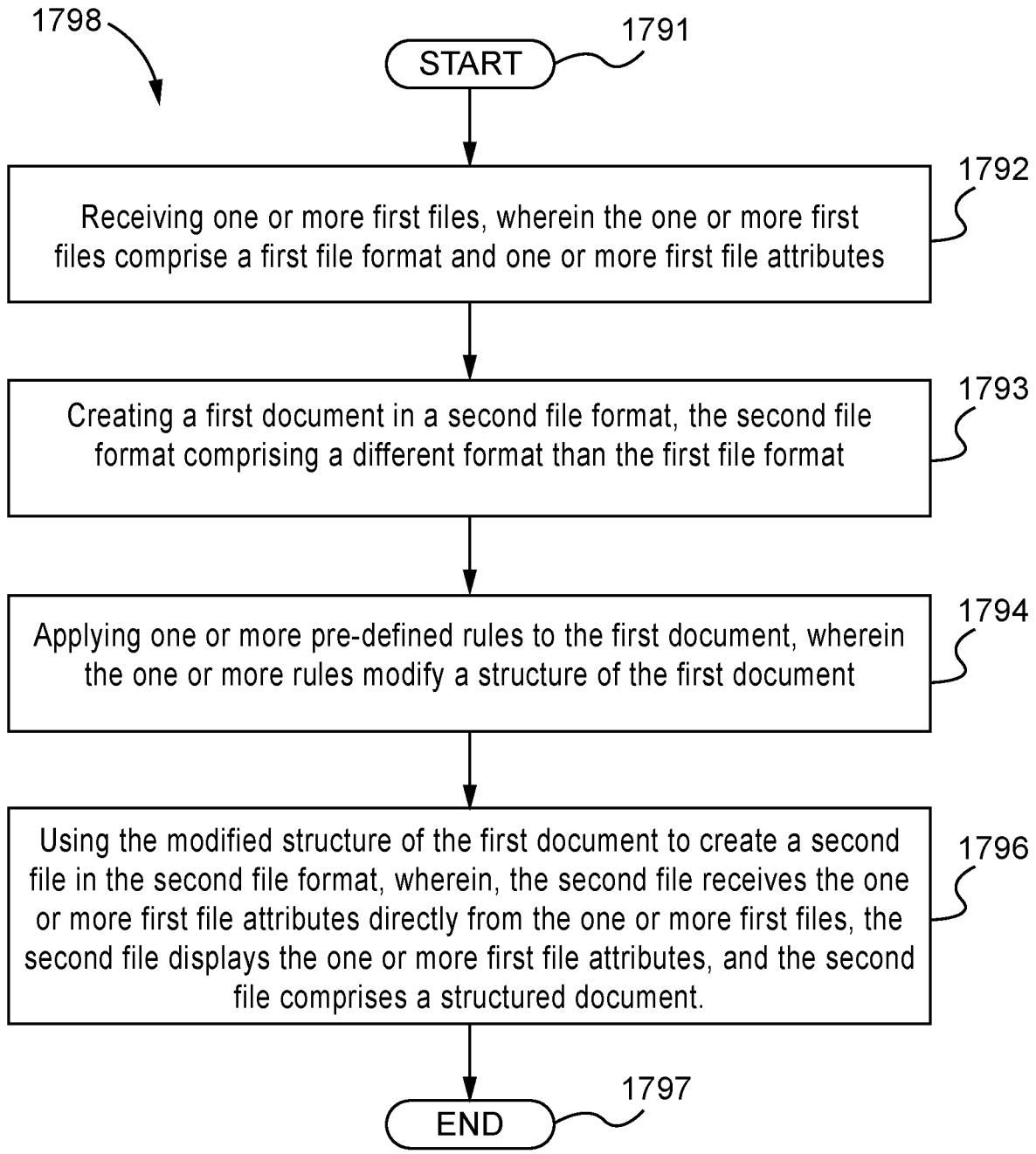
FIG. 17 is a method that may be implemented using one or more aspects of the structured document creation and processing system, dynamic data storage and reporting system of FIG. 1.

Turning now to FIG. 17, seen is a method 1798 of creating a structured document. One such method 1798 starts at 1791 and at 1792 comprises receiving one or more first files, wherein the one or more first files comprise a first file format and one or more first file attributes. The one or more first files, the first file format, and the one or more first file attributes may comprise the one or more first files, the first file format, and the one or more first file attributes described herein. At 1793 the method 1798 comprises creating a first document in a second file format wherein, the second file format is different than the first file format. The first document and second file format may comprise the first document and second file format described herein. At 1794 the method 1798 comprises applying one or more pre-defined rules to the first document, wherein the one or more rules modify a structure of the first document. Here, the rules may comprise the roles, which may help to enter the GUID into the DITA file. At 1796 the method 1798 comprises using the modified structure of the first document to create a second file in the second file format with the second file receiving the one or more first file attributes directly from the one or more first files, the second file displaying the one or more first file attributes, and the second file comprising a structured document.

The first file format may comprise an XBRL format. The one or more first file attributes may comprise XBRL data. The second file format may comprise a DITA format, with the DITA format comprises a DITA topic. Furthermore, the one or more pre-defined rules may comprise XBRL roles, with the XBRL roles enabling proper formatting of the XBRL data within the DITA topic. Using the modified structure of the first document to create a second file in the second file format may comprise inserting a GUID into the second file. A CCMS may be used to process the DITA topic after inserting a GUID into the second file. The CCMS may utilize the GUID to reference the one or more first file attributes in the second file.

As described, upon uploading the customer data 110 (e.g., an XBRL file, as described with reference to FIG. 9 and elsewhere) to the system 100, the customer data 110 may be customized in order to map the data to a structured text format. Customer provided XBRL data from a customer data XBRL database 112 may be received. The customer data 110 may be modified and transferred 115 (i.e., uploaded, ingested, or submitted) to the XBRL database 120 using numerous methods. In addition to the method described above, the data 110 may be transferred 115 via one or more of an extract, transform, load ("ETL") process, a spreadsheet template, and through direct manual or automatic data entry. One such method may comprise a customer portal such as, but not limited to the dashboard 722, used to upload and transfer 115 the customer data 110, which may be stored in an XBRL database 120. The customer portal may be an online portal accessible through one or more types of internet-connected customer computing devices. It is possible that each of the one or more types of internet-connected customer computing devices may be located at separate or the same physical locations and may access the portal at different, or the same, times. Furthermore, the transfer 115 of customer data 110 may further comprise batch uploads of data such as, but not limited to, financial data. It is contemplated that batch uploads of such data may be implemented via an XML file submission using historical EDGAR XBRL and/or via spreadsheet upload. Other batch data submission types are contemplated. Upon the transfer 115 of such batch data 110 or other data 110, and as described above, it is contemplated that the data 110 may be customized to map customer-specific information to the XBRL database 120. Ultimately, and as described herein, the customer data 110 documents containing the XBRL information may be used within a structured text (e.g., DITA) format.

Upon uploading the customer data 110 and placing the XBRL customer data in the XBRL database 120, the customer data 110 (with the XBRL information) may be accessed by an XML editor 140, also referred herein to as an XML document. The merging process described above may embed 125 the XBRL data in a DITA topic document in order for the XML editor 140 to produce reports 145. One XML editor 140 may comprise a CCMS. This embedding 125 may occur through a typical XBRL instance within the XML or DITA document. One such editor 140 may comprise a look-and-feel similar to, and operate similarly to, a Microsoft® Word document and editor. Furthermore, the editor 140 may import 135 a structured text format such as, but not limited to, a DITA XML data model from a structured text database 130.

Turning now to FIG. 3, seen is the customer data 210, 310 income statement of FIG. 2 after the income statement has been ingested into the system 100 and the XBRL tags and DITA structure has been added to the document via the XML editor 140 and may comprise a DITA document. The DITA structure is shown by various DITA elements 302. The DITA elements 302 shown in FIG. 3 are evidenced the entry 302' element, body 302" element, and top-level topic 302''' element. Other DITA elements 302 are shown in FIG. 3. Additionally, the FIG. 3 income statement includes XBRL tags 304 such as, but not limited to the xbrl-block tag 304', xbrl-fact tag 304', and xbrlID tag 304'''. The xbrl-fact tag 304" may be utilized by the CCMS to process the DITA document. The data 306 comprising a numerical value may be manually entered into the document. It is also contemplated that the data 306 may comprise text information, a symbol, an image, or any other information. The XBRL tags 304 and DITA elements 302 may be created manually.

The customer data 310 seen in FIG. 3 with the DITA elements 302 and XBRL tags 304, may comprise the DITA document 1462 seen in FIG. 14. The customer data 310 may be transformed to a create a deliverable 160. For example, a publishing system 150, such as, but not limited to, an XPP publishing engine, also referred to herein as an XPP publishing system, may be used to access 145 the DITA document 1462 within the XML editor 140, transform the content, compose and render 155 deliverables 160 comprising high-quality reports based on the content. Such reports may comprise pdf documents, PostScript files, or files having an epub e-book file format. Specifications regarding the style and features in such reports and deliverables 160 may be customizable by the user. For example, the deliverables 160 may comprise Form 10-K and Form 10-Q documents comprising formats for submission to the SEC. Such a publishing system may automate the composition and pagination of the XML content contained in the XML editor 140. Multi-sourced data may be combined via an automated end-to-end publishing workflow to provide a final and complete deliverable 160 (e.g., a pdf report).

To enable creation of the deliverables 160, upon encountering an xbrl-fact tag 304' during the processing of the document, the publishing system 150 may be configured to obtain various XBRL attributes (e.g., the properties 1456, as seen in FIG. 14) associated with the xbrl-fact tag 304'. These XBRL attributes may be required to ensure the deliverable 160 is in the proper format required for submission of the document to a third party and may help further define the data 306. In one such embodiment, upon encountering the xbrl-fact tag 304', the publishing system 150 may be configured to process the xbrl-fact tag 304' by associating the xbrlID element 304' with a globally unique identifier ("GUID"). The GUID may be used to obtain the attributes related to the data.

Figure 4:
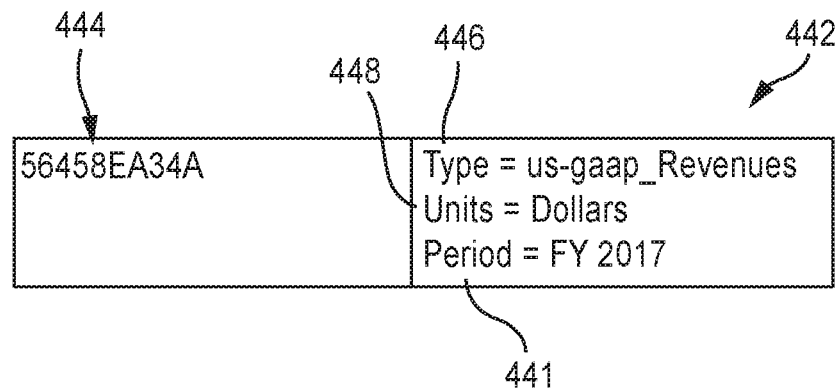
FIG. 4 is an entry table associating a GUID with various XBRL attributes for the customer data document of FIG. 1.

For example, one of the xbrlID elements 304''' seen in FIG. 3 comprises the entry "us-gaap_Revenues". Such an entry may comprise a GUID. The GUID and associated type, unit, and period may be placed into an entry table located in the XBRL database 120 or any other device seen in FIG. 1 or may be stored in a third-party device not see in FIG. 1. Seen in FIG. 4 is one entry 442 in such an entry table, with the entry 442 being associated with a single data 306 entry in a customer data 310 file. The entry 442 shown in FIG. 4 comprises a GUID 444, the data type 446, data unit 448, and data period 441. Together, the data type 446, data unit 448 and data period 441 may comprise "data attributes" and may be associated with the data 306 within the particular xbrl-fact tag 306'' associated with the GUID. Other data attributes are contemplated. Furthermore, other data points 306' in the customer data 310 may comprise similar entries 420. The publishing system 150 accessing the xbrl-fact tags 306' through the XML editor 140 document will obtain these attributes from the entry table the when creating the deliverable and enter these attributes into the final deliverable 160 document.

Seen in FIG. 5 is one example of DITA code with XBRL tags in a format to create a portion of the deliverable 660 comprising a form 6-K table, as shown in FIG. 6. The format of the data shown in FIG. 5 and the form displayed in FIG. 6 adhere to the rules, regulations, and standards as set by the SEC to create the reported 6-K. The data 506 may comprise the value of finished goods inventory. Upon encountering the xbrl-fact tag 302 associated with this data 506 in a formatted customer data 310 document, as seen in FIG. 3, the publishing system 150 is adapted to access within the entry table, the specific entry associated with the customer data 310 GUID, obtain the XBRL attributes, and place the attributes in the proper format in the deliverable 560, 660. As seen, the period 541, unit 548 and type 546 are all displayed.

Using a structured text format (e.g., DITA) in the customer data 310 enables the ability to re-use the aspects of the data 310 in generating a financial reporting document, replacing the use of a plain text editor such as Microsoft® Word. Similarly, use of the XBRL elements 304 in the customer data 310 from the XBRL database 120 would replace the currently-used practice of utilizing Microsoft® Excel® as the financial analysis data format. It is contemplated that the editor 140 may implement other software architecture and/or structured text 130 data models such as, but not limited to, a proprietary schema.

The deliverable 560, 600 seen in FIGS. 5 & 6 may comprise one such deliverable that includes reusable data. For example, future deliverables may require use of the same data 506 from a past reporting period, in addition to a current, or more recent, reporting period. In such a future deliverable 160, the same DITA structure and XBRL tags may be used, in addition to e DITA topics and XBRL tags for any new data. The DITA elements, XBRL tags and any other code (e.g, FIG. 5) enabling these, or other, features, the code may be mapped to, or otherwise reference, the source DITA/XBRL elements and attributes. For example, one set of DITA elements and attributes used to create financial reporting document deliverables 160 are related to updating the DITA elements 302 and/or XBRL elements 304 to reflect data from a new reporting period and may comprise information related to editing, reviewing, and publishing.

As seen in FIG. 1, deliverables 160 may comprise an EDGAR HTML file and/or an XBRL association. The specifications to create these deliverables 160 and other deliverables 160 may be mapped to the source DITA and XBRL elements and attributes. One such mapping may include DITA authoring tools that support content authoring and the reuse/syndication of the content. In order for public companies to comply with SEC requirements, such a file may be created through the use of varying scripts and programs drafted with a structured scripting language such as, but not limited to, Legato, C, or JavaScript. These types of programming languages enable the ability to access the XML data and extend the information to support the SEC reporting requirements. The EDGAR HTML file may be used for HTML SEC filings. The rendering 155 element in FIG. 1 may also be referred to herein as reporting channels or a reporting process and the deliverables 160 of FIG. 1 may be referred to herein as reporting formats or a channel report format. The reporting channels and reporting formats of the component content management system described herein may be achieved by stripping out any production coding not required by the published format of any given report, including, but not limited to, XML, DITA, and XBRL production coding. The reporting process may be automated for each channel report format. In addition to integrating the DITA component content management system XPP, the DITA CCMS may also be integrated with a Quark and/or an InDesign environment. Other integration types known in the art are contemplated.

One embodiment of the invention may comprise a customer portal or a dashboard. One section of the dashboard may enable the customer to associate a new entity with the system 100. Upon associating the entity with the system 100, the system 100 may retrieve existing tiling documents from the SEC. For example, HTML files may be obtained as well as the associated XBRL data and files. The system 100 may further enable creation of an Application Programming Interface ("API") to a CCMS. Such an API may be created automatically by the system. Through such an API, the system 100 may have the ability to create folders and save the obtained SEC files to the folder. The system could further create DITA documents from the obtained SEC tiles according to the structure defined herein, merging XBRL data into the DITA topics in the process. Such XBRL data may be entered automatically.

The dashboard described above may further comprise a user interface to access the publishing system 150 and may also include the XML editor 140 and a user interface to upload and/or otherwise access the customer data 110. In one embodiment, the XML editor 140 may comprise a programmatic interface to the publishing system 150 to render the DITA data structure containing XBRL content into a publication-ready format using a predefined publishing template. The XML editor 140 may also comprise a status feature enabling a user to determine the reporting status of any uploaded customer data 110. In general, the XML editor 140 may include a front-end component 152 implementing a back-end system for SEC reporting.

The XML document accessed by the XML editor 140 and described above utilizing the DITA schema and incorporating XBRL information may be automatically created during the importing and/or embedding 125 steps, shown in FIG. 1. These steps may occur substantially or generally simultaneously. For example, a third-party application or software program may be utilized to convert the customer data 110 to a DITA data model, placing tables in the proper location. The customer data 110 may be broken into the proper topic and map files. When in use, the DITA taxonomy is used to create a hierarchy to organize data and data types in a repeatable manner.

In one embodiment, the XML editor 140 may comprise a customizable user interface adapted to support varying functional requirements and design elements. The editor 140 may be available to the customer via the customer portal described above with reference to the customer data 110 upload. In one such embodiment, the portal may comprise a single sign on cloud-based SAAS application. A system administrator may enable various aspects of the system 100 accessible to the user, depending on the level of access granted to the user. For example, access may be granted to only the XML editor 140 and publishing system 150, as seen and described below. Or, access may be granted to the entire system 100.

The XML editor 140 may further comprise additional features. One such feature may comprise a revision element enabling a user to revise the XBRL data received from the XBRL database. One such revision feature may ensure changes to the XBRL data are pushed back into the XBRLedger, establishing a single data source of "truth" for all company financial information and XBRL data. Users (e.g., customers) may also be provided the capability to revise other types of data within the system 100. In one embodiment, upon logging into a user portal, functionality may also be provided to enable the user to conduct a search of any uploaded data. Such a search feature may be used to locate items to revise. In one embodiment, web forms may be provided to revise previously-stated financial data. Through such web forms, the XML editor 140 may make changes to the source DITA and XBRL. The searching capability may utilize a wizard-driven assembly logic to assemble the report based upon the form type. For financial documents, the wizard may take into account the financial report elements such as, but not limited to, the reporting period and jurisdictional recipient. Utilizing structured data within the component content management system (CCMS) enables the reuse of data components within or amongst reports. Those data components can consist of XBRL data embedded within DITA prose.

Figure 18:
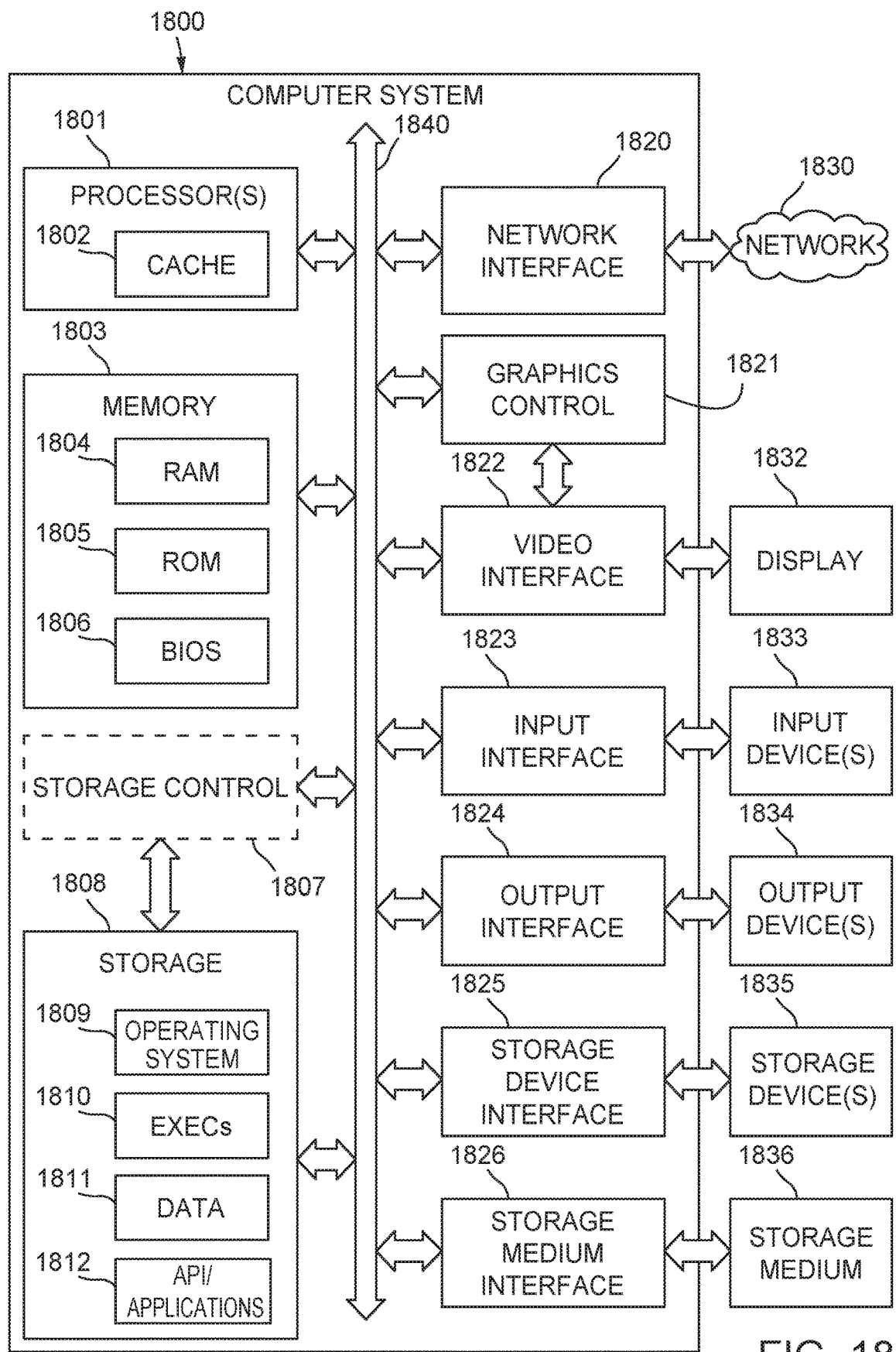
FIG. 18 is a diagrammatic representation of one embodiment of a computer system that may utilized to the structured document creation and processing system, dynamic data storage and reporting system of FIG. 1.

In addition to the specific embodiments described herein, the systems and methods described herein can be implemented in a computer system such as, but not limited to, the FIG. 18 diagrammatic representation of one embodiment of a computer system 1800, within which a set of instructions can execute for causing a device to perform or execute any one or more of the aspects and/or methodologies of the present disclosure. The components in FIG. 18 are examples only and do not limit the scope of use or functionality of any hardware, software, firmware, embedded logic component, or a combination of two or more such components implementing particular embodiments of this disclosure. Some or all of the illustrated components can be part of the computer system 1800. For instance, the computer system 1800 can be a general purpose computer (e.g., a laptop computer) or an embedded logic device (e.g., an FPGA), to name just two non-limiting examples.

Moreover, the components may be realized by hardware, firmware, software or a combination thereof. Those of ordinary skill in the art n view of this disclosure will recognize that if implemented in software or firmware, the depicted functional components may be implemented with processor-executable code that is stored in a non-transitory, processor-readable medium such as non-volatile memory. In addition, those of ordinary skill in the art will recognize that hardware such as field programmable gate arrays (FPGAs) may be utilized to implement ne or more of the constructs depicted herein.

Computer system 1800 includes at least a processor 201 such as a central processing unit (CPU) or an FPGA to name two non-limiting examples. Any of the subsystems described throughout this disclosure could embody the processor 1801. The computer system 1800 may also comprise a memory 1803 and a storage 1808, both communicating with each other, and with other components, via a bus 1840. The bus 1840 may also link a display 1832, one or more input devices 18233 (which may, for example, include a keypad, a keyboard, a mouse, a stylus, etc.), one or more output devices 1834, one or more storage devices 1835, and various non-transitory, tangible computer-readable storage media 1836 with each other and/or with one or more of the processor 1801, the memory 1803, and the storage 1808. All of these elements may interface directly or via one or more interfaces or adaptors to the bus 1840. For instance, the various non-transitory, tangible computer-readable storage media 236 can interface with the bus 240 via storage medium interface 1826. Computer system 1800 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 1801 (or central processing unit(s) (CPU(s))) optionally contains a cache memory unit 1832 for temporary local storage of instructions, data, or computer addresses. Processor(s) 1801 are configured to assist in execution of computer-readable instructions stored on at least one non-transitory, tangible computer-readable storage medium. Computer system 1800 may provide functionality as a result of the processor(s) 1801 executing software embodied in one or more non-transitory, tangible computer-readable storage media, such as memory 1803, storage 1808, storage devices 1835, and/or storage medium 1836 (e.g., read only memory (ROM)). Memory 1803 may read the software from one or more other non-transitory, tangible computer-readable storage media (such as mass storage device(s) 1835, 1836) or from one or more other sources through a suitable interface, such as network interface 1820. Any of the subsystems herein disclosed could include a network interface such as the network interface 1820. The software may cause processor(s) 1801 to carry out one or more processes or one or more steps of one or more processes described or illustrated herein. Carrying out such processes or steps may include defining data structures stored in memory 1803 and modifying the data structures as directed by the software. In some embodiments, an FPGA can store instructions for carrying out functionality as described in this disclosure. In other embodiments, firmware includes instructions for carrying out functionality as described in this disclosure.

The memory 1803 may include various components (e.g., non-transitory, tangible computer-readable storage media) including, but not limited to, a random access memory component (e.g., RAM 1804) (e.g., a static RAM "SRAM", a dynamic RAM "DRAM, etc.), a read-only component (e.g., ROM 1805), and any combinations thereof. ROM 1805 may act to communicate data and instructions unidirectionally to processor(s) 1801, and RAM 1804 may act to communicate data and instructions bidirectionally with processor(s) 1801. ROM 1805 and RAM 1804 may include any suitable non-transitory, tangible computer-readable storage media. In some instances, ROM 1805 and RAM 1804 include non-transitory, tangible computer-readable storage media for carrying out a method. In one example, a basic input/output system 1806 (BIOS), including basic routines that help to transfer information between elements within computer system 1800, such as during start-up, may be stored in the memory 1803.

Fixed storage 1808 is connected bi-directionally to processor(s) 1801, optionally through storage control unit 1807. Fixed storage 1808 provides additional data storage capacity and may also include any suitable non-transitory, tangible computer-readable media described herein. Storage 208 may be used to store operating system 1809, EXECs 1810 (executables), data 1811, API applications 1812 (application programs), and the like. Often, although not always, storage 1808 is a secondary storage medium (such as a hard disk) that is slower than primary storage (e.g., memory 1803). Storage 1808 can also include an optical disk drive, a solid-state memory device (e.g., flash-based systems), or a combination of any of the above. Information in storage 1808 may, in appropriate cases, be incorporated as virtual memory in memory 1803.

In one example, storage device(s) 1835 may be removably interfaced with computer system 1800 (e.g., via an external port connector (not shown)) via a storage device interface 1825. Particularly, storage device(s) 1835 and an associated machine-readable medium may provide nonvolatile and/or volatile storage of machine-readable instructions, data structures, program modules, and/or other data for the computer system 1800. In one example, software may reside, completely or partially, within a machine-readable medium on storage device(s) 1835. In another example, software may reside, completely or partially, within processor(s) 1801.

Bus 1840 connects a wide variety of subsystems. Herein, reference to a bus may encompass one or more digital signal lines serving a common function, where appropriate. Bus 240 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1800 may also include an input device 1833. In one example, a user of computer system 1800 may enter commands and/or other information into computer system 1800 via input device(s) 1833. Examples of an input device(s) 1833 include, but are not limited to, an alphanumeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 1833 may be interfaced to bus 1840 via any of a variety of input interfaces 1823 (e.g., input interface 1823) including, but not limited to, serial, parallel, game port, USB, FIREWIRE, THUNDERBOLT, or any combination of the above.

In particular embodiments, when computer system 1800 is connected to network 1830, computer system 1800 may communicate with other devices, such as mobile devices and enterprise systems, connected to network 1830. Communications to and from computer system 1800 may be sent through network interface 1820. For example, network interface 1820 may receive incoming communications (such as requests or responses from other devices) in the form of one or more packets (such as Internet Protocol (IP) packets) from network 1830, and computer system 1800 may store the incoming communications in memory 1803 for processing. Computer system 1800 may similarly store outgoing communications (such as requests or responses to other devices) in the form of one or more packets in memory 1803 and communicated to network 1830 from network interface 1820. Processor(s) 1801 may access these communication packets stored in memory 1803 for processing.

Examples of the network interface 1820 include, but are not limited to, a network interface card, a modem, and any combination thereof. Examples of a network 1830 or network segment 1830 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 1830, may employ a wired and/or a wireless mode of communication. In general, any network topology may be used.

Information and data can be displayed through a display 1832. Examples of a display 1832 include, but are not limited to, a liquid crystal display (LCD), an organic liquid crystal display (OLED), a cathode ray tube (CRT), a plasma display, and any combinations thereof. The display 1832 can interface to the processor(s) 1801, memory 1803, and fixed storage 1808, as well as other devices, such as input device(s) 1833, via the bus 1840. The display 1832 is linked to the bus 1840 via a video interface 1822, and transport of data between the display 1832 and the bus 1840 can be controlled via the graphics control 1821.

In addition to a display 1832, computer system 1800 may include one or more other peripheral output devices 1834 including, but not limited to, an audio speaker, a printer, and any combinations thereof. Such peripheral output devices may be connected to the bus 240 via an output interface 1824. Examples of an output interface 1824 include, but are not limited to, a serial port, a parallel connection, a USB port, a FIREWIRE port, a THUNDERBOLT port, and any combinations thereof.

In addition or as an alternative, computer system 1800 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

It is contemplated that one or more of the components or subcomponents described in relation to the computer system 1800 shown in FIG. 18 such as, but not limited to, the network 1830, processor 1801, memory, 1803, etc., may comprise a cloud computing system. In one such system, front-end systems such as input devices 1833 may provide information to back-end platforms such as servers (e.g. computer systems 200) and storage (e.g., memory 203). Software (i.e., middleware) nay enable interaction between the front-end and back-end systems, with the back-end system providing services and online network storage to multiple front-end clients. For example, a software-as-a-service (SAAS) model may implement such a cloud-computing system. In such a system, users may operate software located on back-end servers through the use of a front-end software application such as, but not limited to, a web browser.

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A structured document creation system comprising, one or more hardware processors configured by machine-readable instructions, a central processing unit, and one or more of a memory device and one or more storage devices;
 one or more first files, wherein the one or more first files comprise,
 a first file format, and
 one or more first file attributes, wherein the first file format comprises an eXtensible Business Reporting Language (XBRL) format and the one or more first file attributes comprises XBRL data, and wherein the one or more first files comprise financial reporting information, the financial reporting information in the first file format comprises tagged financial reporting information;
 a structured document creation portion, wherein, the structured document creation portion comprises,
 a plurality of first documents in a second file format, wherein the second file format comprises a Darwin Information Typing Architecture (DITA) format, the DITA format comprising a DITA topic,
 a plurality of rules relating to the second file format and the first file format, wherein the plurality of rules comprise XBRL roles, and wherein the XBRL roles enable formatting of the XBRL data within the DITA topic,
 an output comprising one or more second files, wherein,
 the one or more second files,
 comprise the second file format,
 a financial reporting document, wherein the financial reporting document comprises a financial reporting document format, and
 a Globally Unique Identifier (GUID), wherein the GUID is mapped to the one or more first file attributes,
 are dependent upon,
  the plurality of first documents, and
  the plurality of rules, and
 the output comprises the one or more first file attributes received directly from the one or more first files, and wherein the GUID enables use of the first file attributes in the second file and the output, and wherein the one or more first file attributes are displayed in the one or more second files.

2. The structured document creation system of claim 1 wherein the one or more storage devices save the
 one or more first files;
 plurality of first documents;
 plurality of rules; and
 the one or more second files.

3. The structured document creation system of claim 2 wherein,
  the one or more first files comprise,
    an original first file, the original first file relating to a first reporting period, and
    a later first file, the later first file comprising one or more later first file attributes;
  the later first file and the one or more later first file attributes relate to a second reporting period, the second reporting period comprising a reporting period after the first reporting period;
  the one or more second files comprise,
    an original second file, the original second file relating to the first reporting period, and
      an additional second file, the additional second file, relating to the second reporting period, and
    comprising a second file output; and
  the second file output comprises,
    the one or more first file attributes received directly from the one or more first files, and
    the one or more later first file attributes received directly from the one or more later first files.

4. A method of creating a structured document comprising,
  receiving one or more first files, wherein the one or more first files comprise,
  a first file format, and
  one or more first file attributes, wherein the first file format comprises an eXtensible Business Reporting Language (XBRL) format and the one or more first file attributes comprises XBRL data;
  creating a first document in a second file format wherein, the second file format comprises a Darwin Information Typing Architecture (DITA) format, the DITA format comprising a DITA topic;
  applying one or more pre-defined rules to the first document, wherein the one or more pre-defined rules modify a structure of the first document, and wherein the one or more pre-defined rules comprise XBRL roles, and wherein the XBRL roles enable formatting of the XBRL data within the DITA topic;
  using the modified structure of the first document to create a second file in the second file format, wherein, using the modified structure of the first document to create a second file in the second file format comprises inserting a Globally Unique Identifier (GUID) into the second file, and wherein the GUID is mapped to the one or more first file attributes,
  using a component content management system to process the DITA topic after inserting the GUID into the second file, wherein,
  the second file receives the one or more first file attributes directly from the one or more first files,
  the component content management system uses the GUID to reference the one or more first file attributes in the second file,
  the second file displays the one or more first file attributes, and
  the second file comprises a structured document.

5. A non-transitory, tangible computer readable storage medium, encoded with processor readable instructions to perform a method for creating a structured document, the method comprising:
  receiving one or more first files, wherein the one or more first files comprise,
  a first file format, and
  one or more first file attributes, wherein the first file format comprises an eXtensible Business Reporting Language (XBRL) format and the one or more first file attributes comprises XBRL data;
  creating a first document in a second file format wherein, the second file format comprises a Darwin Information Typing Architecture (DITA) format, the DITA format comprising a DITA topic;
  applying one or more pre-defined rules to the first document, wherein the one or more pre-defined rules modify a structure of the first document, and wherein the one or more pre-defined rules comprises XBRL roles, and wherein the XBRL roles enable formatting of the XBRL data within the DITA topic;
  using the modified structure of the first document to create a second file in the second file format, wherein, using the modified structure of the first document to create a second file in the second file format comprises inserting a Globally Unique Identifier (GUID) into the second file, and wherein the GUID is mapped to the one or more first file attributes,
  using a component content management system to process the DITA topic after inserting the GUID into the second file, wherein,
  the second file receives the one or more first file attributes directly from the one or more first files,
  the component content management system uses the GUID to reference the one or more first file attributes in the second file,
  the second file displays the one or more first file attributes, and
  the second file comprises a structured document.

6. A structured document creation system comprising,
  one or more hardware processors configured by machine-readable instructions, a central processing unit, and one or more of a memory device and one or more storage devices;
  one or more first files, wherein the one or more first files comprise,
  a first file format, and
  one or more first file attributes, wherein the first file format comprises an eXtensible Business Reporting Language (XBRL) format and the one or more first file attributes comprises XBRL data;
  a structured document creation portion, wherein, the structured document creation portion comprises,
  a plurality of first documents in a second file format, wherein the second file format comprises a Darwin Information Typing Architecture (DITA) format, the DITA format comprising a DITA topic,
  a plurality of rules relating to the second file format and the first file format, wherein the plurality of rules are applied to at one of the first documents to modify a structure of the at least one of the first documents, wherein the plurality of rules comprise XBRL roles, and wherein the XBRL roles enable formatting of the XBRL data within the DITA topic,
  an output comprising one or more second files, wherein, the one or more second files,
    comprise the second file format and a Globally Unique Identifier (GUID), wherein the GUID is mapped to the one or more first file attributes, are dependent upon,
  the plurality of first documents, and
  the plurality of rules, and
the output comprises the one or more first file attributes
  received directly from the one or more first files, and
  wherein the GUID enables use of the first file attributes in the one or more second files and the output,
  and wherein the one or more first file attributes are
  displayed in the one or more second files.

* * * * *